US012424167B2

(12) United States Patent

Li et al.

(10) Patent No.: US 12,424,167 B2

(45) Date of Patent: Sep. 23, 2025

(54) DISPLAY APPARATUS, METHOD OF DISPLAYING IMAGE, AND COMPUTER-PROGRAM PRODUCT

(71) Applicants: Hefei BOE Joint Technology Co., Ltd., Anhui (CN); BOE Technology Group Co., Ltd., Beijing (CN)

(72) Inventors: Huihui Li, Beijing (CN); Pengfei Yin, Beijing (CN); Wenchao Bao, Beijing (CN); Miao Liu, Beijing (CN); Shuyu Cao, Beijing (CN)

(73) Assignees: Hefei BOE Joint Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/690,568

(22) PCT Filed: May 24, 2023

(86) PCT No.: PCT/CN2023/095933

§ 371 (c)(1),
(2) Date: Mar. 8, 2024

(87) PCT Pub. No.: WO2024/239259

PCT Pub. Date: Nov. 28, 2024

(65) Prior Publication Data

US 2025/0232720 A1 Jul. 17, 2025

(51) Int. Cl.
*G09G 3/3233* (2016.01)

(52) U.S. Cl.
CPC ..... *G09G 3/3233* (2013.01); *G09G 2320/046* (2013.01); *G09G 2320/0626* (2013.01)

(58) Field of Classification Search
None
See application file for complete search history.

(56) References Cited

U.S. PATENT DOCUMENTS 7,352,349 B2 * 4/2008 Baek .................... G09G 3/3659 345/98
11,176,908 B1 * 11/2021 Kuo ......................... G09G 5/02
(Continued)

FOREIGN PATENT DOCUMENTS

CN 102708785 B 6/2015
CN 105096898 A 11/2015
(Continued)

OTHER PUBLICATIONS

International Search Report & Written Opinion mailed Feb. 23, 2024, regarding PCT/CN2023/095933.

*Primary Examiner* — Matthew Yeung

(74) *Attorney, Agent, or Firm* — Intellectual Valley Law, P.C.

(57) ABSTRACT

A display apparatus is provided. The display apparatus includes a display panel; a memory; and one or more processors. The memory stores computer-executable instructions for controlling the one or more processors to detect a region configured to display a static image; in the region configured to display the static image, detect a parameter of driving transistors of subpixels of a first color in first periods, and detect a parameter of driving transistors of subpixels of a second color in second periods; and determine subpixel values of subpixels in a respective pixel in the static image in a respective frame of image comprising the static image. The parameter of driving transistors of subpixels of the first color is detected with a first frequency; the parameter of driving transistors of subpixels of the second color is detected with a second frequency; and the first frequency is higher than the second frequency.

20 Claims, 16 Drawing Sheets

(56) References Cited

U.S. PATENT DOCUMENTS

| | | | | |
|---|---|---|---|---|
| 11,645,734 | B2 * | 5/2023 | Chou | G06T 3/4015 382/167 |
| 12,299,935 | B2 * | 5/2025 | Zhou | G06T 3/4015 |
| 2015/0363916 | A1 * | 12/2015 | Botzas | H04N 23/12 382/167 |
| 2016/0085116 | A1 * | 3/2016 | Iwatsu | G02F 1/136286 349/144 |
| 2017/0154588 | A1 * | 6/2017 | Du | G09G 3/3614 |
| 2018/0068604 | A1 * | 3/2018 | Zeng | G09G 3/3275 |

FOREIGN PATENT DOCUMENTS

| | | | |
|---|---|---|---|
| CN | 106205485 | A | 12/2016 |
| CN | 112086072 | A | 12/2020 |
| CN | 112309307 | A | 2/2021 |
| EP | 3669353 | A1 | 6/2020 |
| WO | 2020065947 | A1 | 4/2020 |

* cited by examiner

DISPLAY APPARATUS, METHOD OF DISPLAYING IMAGE, AND COMPUTER-PROGRAM PRODUCT

CROSS-REFERENCE TO RELATED APPLICATION

This application is a national stage application under 35 U.S.C. § 371 of International Application No. PCT/CN2023/095933, filed May 24, 2023, the contents of which are incorporated by reference in the entirety.

TECHNICAL FIELD

The present invention relates to display technology, more particularly, to a display apparatus, a method of displaying an image, and a computer-program product.

BACKGROUND

Both liquid crystal display panels and organic light emitting diode display panels may experience a technical issue known as ghosting. Ghosting occurs when the display panel continues to show a previous image even after the content has changed, which can negatively impact the visual experience.

SUMMARY

In one aspect, the present disclosure provides a display apparatus, comprising a display panel; a memory; and one or more processors; wherein the memory and the one or more processors are connected with each other and the memory stores computer-executable instructions for controlling the one or more processors to detect a region configured to display a static image; in the region configured to display the static image, detect a parameter of driving transistors of subpixels of a first color in first periods, and detect a parameter of driving transistors of subpixels of a second color in second periods; determine subpixel values of subpixels in a respective pixel in the static image in a respective frame of image comprising the static image; convert the subpixel values of subpixels in the respective pixel in the static image into luminance values of subpixels in the respective pixel in the static image; reduce a first luminance value of a first subpixel in the respective pixel to a first adjusted luminance value; and convert the first adjusted luminance value of the first subpixel in the respective pixel in the static image into a first adjusted subpixel value; wherein the parameter of driving transistors of subpixels of the first color is detected with a first frequency; the parameter of driving transistors of subpixels of the second color is detected with a second frequency, and the first frequency is higher than the second frequency.

Optionally, the memory further stores computer-executable instructions for controlling the one or more processors to cause the display panel to display the static image using subpixel values including the first adjusted subpixel value and the second subpixel value.

Optionally, the first luminance value of the first subpixel in the respective pixel is reduced by a first luminance difference to obtain the first adjusted luminance value; and a first ratio of the first luminance difference to the first luminance value is in a range of 1:10 to 9:10.

Optionally, the memory further stores computer-executable instructions for controlling the one or more processors to increase at least a second luminance value of a second subpixel in the respective pixel to a second adjusted luminance value; convert adjusted luminance values of subpixels in the respective pixel in the static image into adjusted subpixel values of subpixels in the respective pixel in the static image; and cause the display panel to display the static image using the adjusted subpixel values.

Optionally, subsequent to reducing at least the first luminance value of the first subpixel in the respective pixel to the first adjusted luminance value, and increasing at least the second luminance value of the second subpixel in the respective pixel to the second adjusted luminance value, a total luminance value of the subpixels of the respective pixel remains substantially the same.

Optionally, the first luminance value of the first subpixel in the respective pixel is reduced by a first luminance difference to obtain the first adjusted luminance value; the second luminance value of the second subpixel in the respective pixel is increased by a second luminance difference to obtain the second adjusted luminance value; and the second luminance difference is substantially the same as the first luminance difference.

Optionally, a first ratio of the first luminance difference to the first luminance value is in a range of 9:10 to 1:1.

Optionally, the first adjusted luminance value is 0.

Optionally, the first subpixel is a subpixel of a first color, the second subpixel is a subpixel of a second color, the first color being different from the second color.

Optionally, the memory further stores computer-executable instructions for controlling the one or more processors to reduce a third luminance value of a third subpixel in the respective pixel to a third adjusted luminance value; reduce a fourth luminance value of a fourth subpixel in the respective pixel to a fourth adjusted luminance value; increase a second luminance value of a second subpixel in the respective pixel to a second adjusted luminance value; convert the second adjusted luminance value of the second subpixel in the respective pixel in the static image into a second adjusted subpixel value; convert the third adjusted luminance value of the third subpixel in the respective pixel in the static image into a third adjusted subpixel value; convert the fourth adjusted luminance value of the fourth subpixel in the respective pixel in the static image into a fourth adjusted subpixel value; and cause the display panel to display the static image using the first adjusted subpixel value, the second adjusted subpixel value, the third adjusted subpixel value, and the fourth adjusted subpixel value.

Optionally, the first luminance value of the first subpixel in the respective pixel is reduced by a first luminance difference to obtain the first adjusted luminance value; the third luminance value of the third subpixel in the respective pixel is reduced by a third luminance difference to obtain the third adjusted luminance value; the fourth luminance value of the fourth subpixel in the respective pixel is reduced by a fourth luminance difference to obtain the fourth adjusted luminance value; the second luminance value of the second subpixel in the respective pixel is increased by a second luminance difference to obtain the second adjusted luminance value; and the second luminance difference is substantially the same as a sum of the first luminance difference, the third luminance difference, and the fourth luminance difference.

Optionally, a first ratio of the first luminance difference to the first luminance value is substantially the same as a second ratio of the third luminance difference to the third luminance value, and is substantially the same as a third ratio of the fourth luminance difference to the fourth luminance value.

Optionally, the first ratio, the second ratio, and the third ratio are in a range of 6:10 to 8:10.

Optionally, the first subpixel is a subpixel of a first color, the second subpixel is a subpixel of a second color, the third subpixel is a subpixel of a third color, and the fourth subpixel is a subpixel of a fourth color, and the first color, the second color, the third color, and the fourth color are four different colors.

Optionally, the memory further stores computer-executable instructions for controlling the one or more processors to in a first phase, reduce the first luminance value of the first subpixel in the respective pixel to the first adjusted luminance value; increase a second luminance value of a second subpixel in the respective pixel to a second adjusted luminance value; in the first phase, convert the first adjusted luminance value of the first subpixel in the respective pixel in the static image into the first adjusted subpixel value; convert the second adjusted luminance value of the second subpixel in the respective pixel in the static image into a second adjusted subpixel value; and cause the display panel to display the static image using subpixel values including the first adjusted subpixel value and a second subpixel value of a second subpixel in the respective pixel; in a second phase, reduce the first luminance value of the first subpixel in the respective pixel to the first adjusted luminance value; increase a third luminance value of a third subpixel in the respective pixel to a third adjusted luminance value; reduce the second adjusted luminance value of the second subpixel to the second luminance value; and in the second phase, convert the first adjusted luminance value of the first subpixel in the respective pixel in the static image into the first adjusted subpixel value; convert the third adjusted luminance value of the third subpixel in the respective pixel in the static image into a third adjusted subpixel value; and cause the display panel to display the static image using subpixel values including the first adjusted subpixel value and the second subpixel value.

Optionally, in the first phase, the first luminance value of the first subpixel in the respective pixel is reduced by a first luminance difference to obtain the first adjusted luminance value, and the second luminance value of the second subpixel in the respective pixel is increased by a second luminance difference to obtain the second adjusted luminance value; in the first phase, the second luminance difference is substantially the same as the first luminance difference; in the second phase, the first luminance value of the first subpixel in the respective pixel is reduced by a first luminance difference to obtain the first adjusted luminance value, and the third luminance value of the third subpixel in the respective pixel is increased by a third luminance difference to obtain the third adjusted luminance value; and in the second phase, the third luminance difference is substantially the same as the first luminance difference.

Optionally, a first ratio of the first luminance difference to the first luminance value is in a range of 9:10 to 1:1.

Optionally, the first adjusted luminance value is 0.

In another aspect, the present disclosure provides a method of displaying an image, comprising detecting a region configured to display a static image in a display panel; in the region configured to display the static image, detecting a parameter of driving transistors of subpixels of a first color in first periods, and detecting a parameter of driving transistors of subpixels of a second color in second periods; determining subpixel values of subpixels in a respective pixel in the static image in a respective frame of image comprising the static image; converting the subpixel values of subpixels in the respective pixel in the static image into luminance values of subpixels in the respective pixel in the static image; reducing a first luminance value of a first subpixel in the respective pixel to a first adjusted luminance value; and converting the first adjusted luminance value of the first subpixel in the respective pixel in the static image into a first adjusted subpixel value; wherein the parameter of driving transistors of subpixels of the first color is detected with a first frequency; the parameter of driving transistors of subpixels of the second color is detected with a second frequency; and the first frequency is higher than the second frequency.

In another aspect, the present disclosure provides a computer-program product, comprising a non-transitory tangible computer-readable medium having computer-readable instructions thereon, the computer-readable instructions being executable by a processor to cause the processor to perform detecting a region configured to display a static image; in the region configured to display the static image, detecting a parameter of driving transistors of subpixels of a first color in first periods, and detecting a parameter of driving transistors of subpixels of a second color in second periods; determining subpixel values of subpixels in a respective pixel in the static image in a respective frame of image comprising the static image, converting the subpixel values of subpixels in the respective pixel in the static image into luminance values of subpixels in the respective pixel in the static image; reducing a first luminance value of a first subpixel in the respective pixel to a first adjusted luminance value; and converting the first adjusted luminance value of the first subpixel in the respective pixel in the static image into a first adjusted subpixel value; wherein the parameter of driving transistors of subpixels of the first color is detected with a first frequency; the parameter of driving transistors of subpixels of the second color is detected with a second frequency; and the first frequency is higher than the second frequency.

BRIEF DESCRIPTION OF THE FIGURES

The following drawings are merely examples for illustrative purposes according to various disclosed embodiments and are not intended to limit the scope of the present invention.

FIG. 14 is a diagram illustrating luminance values of subpixels in a respective pixel in some embodiments according to the present disclosure.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Figure 1A:
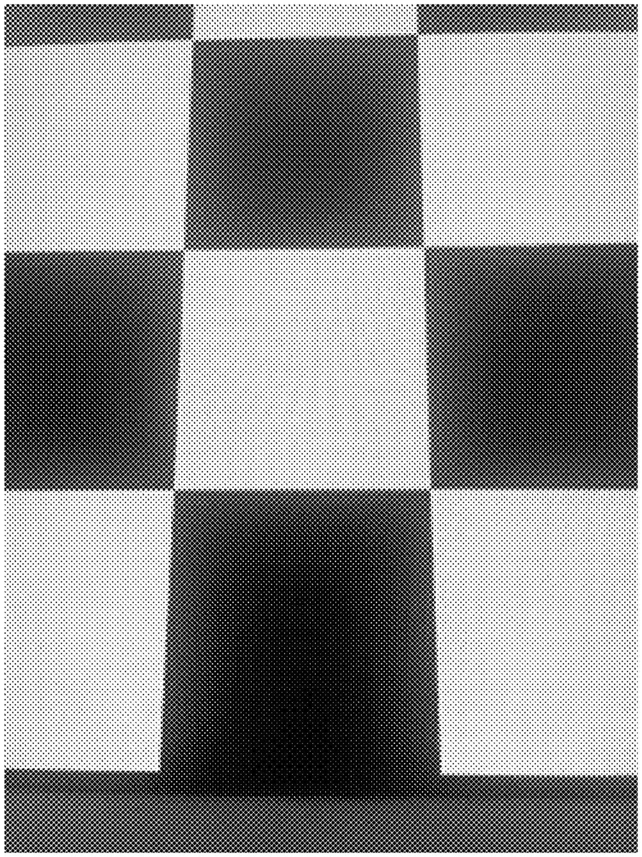
FIG. 1A illustrates a first image displayed by a display panel.
Figure 1B:
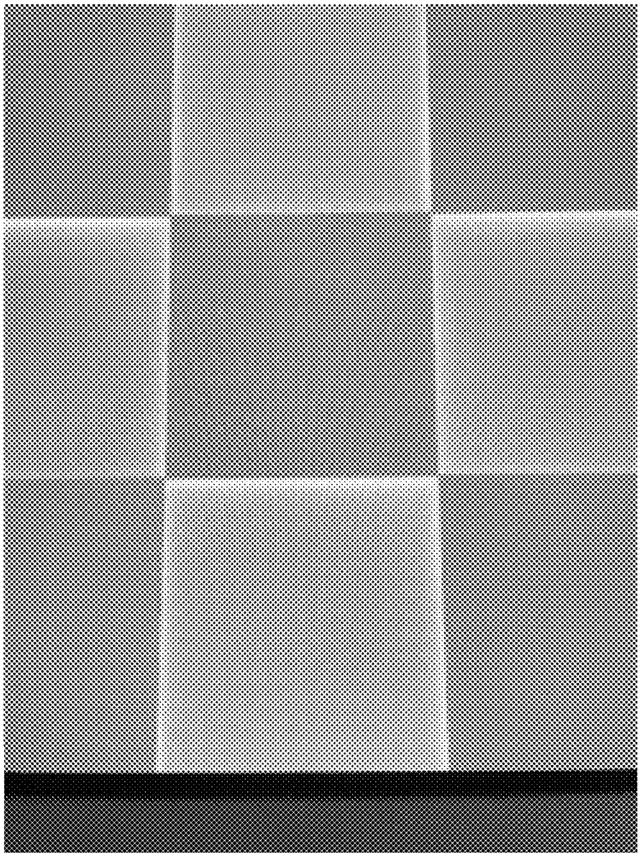
FIG. 1B illustrates a second image displayed by a display panel subsequent to displaying a first image for a period of time.

FIG. 1A illustrates a first image displayed by a display panel. The first image has a checkerboard pattern which includes one or more dark regions (black) and one or more bright regions (white). FIG. 1B illustrates a second image displayed by a display panel subsequent to displaying a first image for a period of time. In one example, the first image was displayed for six hours before switching to the second image. The second image is intended to be an all-white image. However, as shown in FIG. 1B, the one or more bright regions in the first image appears darker in the second image, as compared to the one or more dark regions in the first image. The phenomenon shown in FIG. 1A and FIG. 1B is an example of the occurrence of image retention or burn-in, which can result from prolonged exposure to static images.

In a pixel driving circuit of a display panel, the relationship between the driving current and a threshold voltage of a driving transistor can be expressed as:

$$Id=k*(Vgs-Vth)^2;$$

wherein Id stands for a driving current of the pixel driving circuit, Vg s stands for the gate-source voltage, Vth stands for the threshold voltage of the driving transistor, and k is a parameter that depends on the physical properties of the driving transistor. The k parameter, also known as the transconductance parameter or the device gain factor, represents the slope of the Id-Vgs curve and determines the strength of the transistor's amplification or switching capability, it depends on the physical dimensions and properties of the transistor, such as the channel width and channel length.

The inventors of the present disclosure discover that, at least in organic light emitting display panels, the primary factor contributing to image retention is the threshold voltage and the parameter k of the driving transistor. Prolonged forward stress, exposure to light, and fluctuations in temperature can cause the Vth to shift positively or negatively, leading to irregularities in the display panel such as image retention.

Image retention occurs when the display panel is displaying an image for a prolonged period of time in a region of the display panel. For example, image retention occurs when the display panel is displaying a TV station logo for a prolonged period of time.

The present disclosure provides, inter alia, a display apparatus, a method of displaying an image, and a computer-program product that substantially obviate one or more of the problems due to limitations and disadvantages of the related art. In one aspect, the present disclosure provides a display apparatus. In some embodiments, the display apparatus includes a display panel; a memory; and one or more processors. Optionally, the memory and the one or more processors are connected with each other; and the memory stores computer-executable instructions for controlling the one or more processors to detect a region configured to display a static image in a display panel; in the first region configured to display the static image, detect a parameter of driving transistors of subpixels of a first color in first periods, and detect a parameter of driving transistors of subpixels of a second color in second periods; determine subpixel values of subpixels in a respective pixel in the static image in a respective frame of image comprising the static image; convert the subpixel values of subpixels in the respective pixel in the static image into luminance values of subpixels in the respective pixel in the static image; reduce a first luminance value of a first subpixel in the respective pixel to a first adjusted luminance value; and convert the first adjusted luminance value of the first subpixel in the respective pixel in the static image into a first adjusted subpixel value. Optionally, the parameter of driving transistors of subpixels of the first color is detected with a first frequency. Optionally, the parameter of driving transistors of subpixels of the second color is detected with a second frequency. Optionally, the first frequency is higher than the second frequency.

Figure 2:
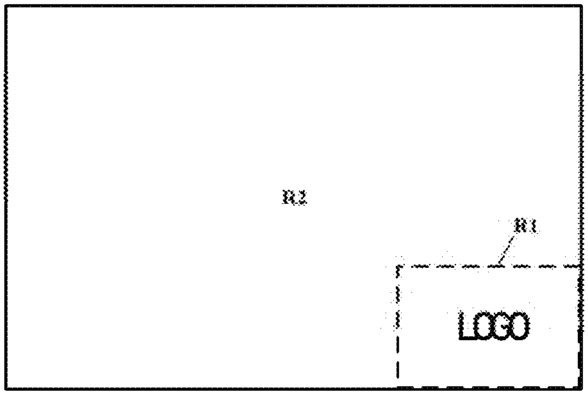
FIG. 2 shows an image display on a display panel in some embodiments according to the present disclosure.

FIG. 2 shows an image display on a display panel in some embodiments according to the present disclosure. Referring to FIG. 2, the display panel is configured to display a static image (denoted as "LOGO" in FIG. 2) in a first region R1 for a period of time greater than a threshold value. Examples of static images include, but are not limited to, a digital on-screen graphic such as a logo that appears in the corner of the screen, usually displaying a television network's name or logo, and it is used to identify the network or program being broadcast. The threshold value may be, for example, greater than 5 minutes, greater than 10 minutes, greater than 15 minutes, greater than 20 minutes, greater than 25 minutes, greater than 30 minutes, greater than 35 minutes, greater than 40 minutes, greater than 45 minutes, greater than 50 minutes, greater than 55 minutes, greater than 1 hour, greater than 2 hours, greater than 3 hours, greater than 4 hours, greater than 5 hours, greater than 6 hours, greater than 7 hours, greater than 8 hours, greater than 9 hours, or greater than 10 hours.

In some embodiments, the display panel is configured to display a dynamic image in a second region R2 outside the first region R1. As used herein, the term "dynamic image" refers to a visual element that contains motion or animation, and changes over time. Examples of dynamic images include a video, an animated graphic, or any other visual content that contains movement. As used herein, the term "static image" refers to a visual element that does not change, and remains fixed on the screen. It is a digital representation that does not contain animation or motion. Examples of static images include digital on-screen graphics, logos, icons, and photographs. As discussed above, the issues of image retention or burn-in are prone to occur in the region (e.g., the first region R1) configured to display a static image.

Although the display panel is configured to display a static image in the first region R1, the display panel may or may not also display a dynamic image in the first region R1 simultaneously. In one example, the display panel is configured to exclusively display a static image in the first region R1. IN another example, the display panel is configured to display a static image and a dynamic image simultaneously in the first region R1.

Figure 3:
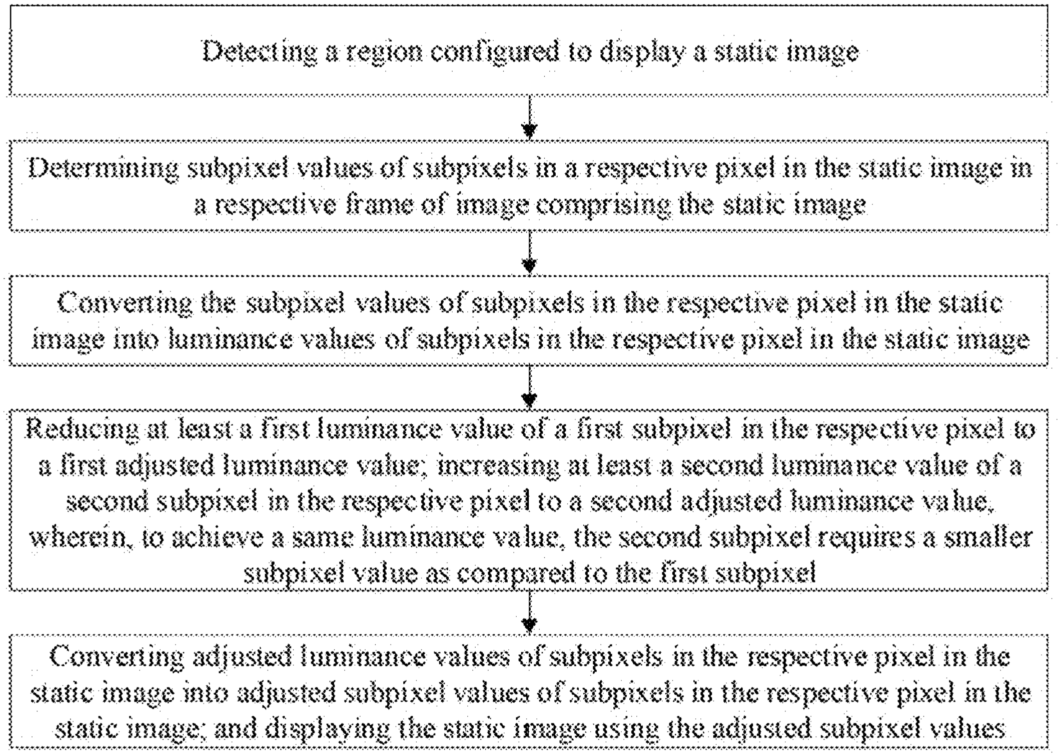
FIG. 3 is a flow chart illustrating a method of displaying an image in some embodiments according to the present disclosure.

FIG. 3 is a flow chart illustrating a method of displaying an image in some embodiments according to the present disclosure. In some embodiments, referring to FIG. 3, the method of displaying an image includes detecting a region configured to display a static image. In some embodiments, the method includes analyzing a video stream in real time, for example, by scanning subpixels of the video stream and identifying any regions that match the characteristics of a static image. Various appropriate characteristics may be used for identifying the static image. Examples of appropriate characteristics include size, shape, color, and position. Various appropriate image processing algorithms may be used to analyze the video stream. Examples of image processing algorithms that may be used include various appropriate image segmentation algorithms such as thresholding or clustering. The image segmentation algorithms can separate the static image from the dynamic image or the background image.

Image segmentation algorithms are configured to divide an image into multiple regions or segments based on their visual characteristics, such as color, texture, or shape. In one example, a thresholding algorithm may be used to separate an image into different segments based on a user-defined threshold value. Pixels with intensities above the threshold are classified as one segment, while pixels below the threshold are classified as another segment. In another example, a clustering algorithm may be used to group pixels to gether based on their similarity in color or other visual features. Examples of clustering algorithms include a k-means algorithm, which groups pixels into k clusters based on their distance from the cluster centers. In another example, an edge-based segmentation algorithm may be used to identify edges in an image and uses them to separate the image into different segments. Examples of edge-based segmentation algorithms include the Canny edge detector, which uses gradient information to identify edges in an image. In another example, a region-based segmentation algorithm may be used to divide an image into regions based on their homogeneity in color or other visual features. Examples of region-based segmentation algorithms include the watershed algorithm, which treats the image as a to pographical map and identifies regions based on the boundaries between different watersheds. In another example, a contour-based segmentation algorithm may be used to identify contours in an image and uses them to separate the image into different segments. Examples of contour-based segmentation algorithms include the active contours or snakes algorithm, which iteratively adjusts the position of a contour to fit the boundaries of an object in an image.

In some embodiments, the method further includes determining subpixel values of subpixels in a respective pixel in the static image in a respective frame of image comprising the static image. A subpixel value typically ranges from 0 to 255. In one example, the subpixel value is a grayscale value of the subpixel. The higher the subpixel value, the higher the brightness or intensity of the light emitted by the subpixel. In one example, the method includes extract a respective frame of image of a plurality of frames of image, e.g., in a video stream; and determining the subpixel values of subpixels in the respective pixel in the static image in the respective frame of image comprising the static image.

In some embodiments, the respective pixel includes a plurality of subpixels of different colors. Optionally, the respective pixel includes a first subpixel of a first color and a second subpixel of a second color. Optionally, the respective pixel further includes a third subpixel of a third color. Optionally, the respective pixel further includes a fourth subpixel of a fourth color. In one example, the first color is a blue color, the second color is a white color, the third color is a red color, and the fourth color is a green color.

In some embodiments, the method further includes converting the subpixel values of subpixels in the respective pixel in the static image into luminance values of subpixels in the respective pixel in the static image. Various appropriate methods may be used to convert the subpixel values of subpixels in the respective pixel in the static image into the luminance values of subpixels in the respective pixel in the static image. In some embodiments, the subpixel values may be converted into the luminance values using gamma values.

In some embodiments, a gamma value is expressed as:

$$\text{gamma value} = \frac{\log\frac{\text{a luminous value corresponding to a subpixel value}}{\text{a luminous value corresponding to a maximum subpixel value}}}{\log\frac{\text{the subpixel value}}{\text{the maximum subpixel value}}}.$$

In some embodiments, a gamma value curve or a gamma value table may be used. Optionally, the method includes converting the subpixel values of subpixels in the respective pixel in the static image into luminance values of subpixels in the respective pixel in the static image using a gamma value table or a gamma value curve.

In one example, the maximum subpixel value is 255.

The gamma value is a parameter that is used to describe the relationship between subpixel values in a digital image and the corresponding luminance values that they represent. The gamma value is a measure of the linearity or nonlinearity of a display's response to changes in input voltage. A gamma value of 1.0 indicates a linear response, while values greater than 1.0 indicate a non-linear response where midtone values are boosted in brightness. A gamma value of 1.0 means that the luminance values increase or decrease linearly with the pixel values. The gamma value is important in accurately reproducing image content on a display, particularly when images are viewed across different devices with varying gamma values.

Figure 4A:
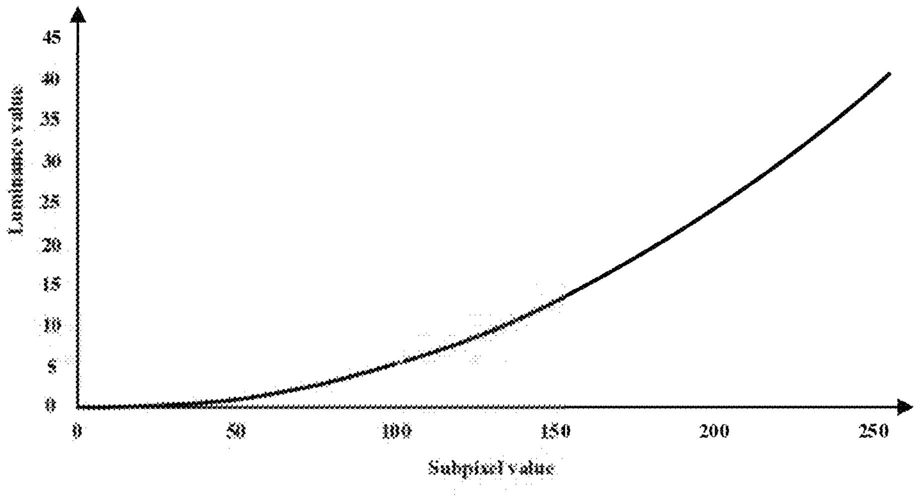
FIG. 4A shows a correlation between luminance values and subpixel values for a first subpixel of a first color in some embodiments according to the present disclosure.
Figure 4B:
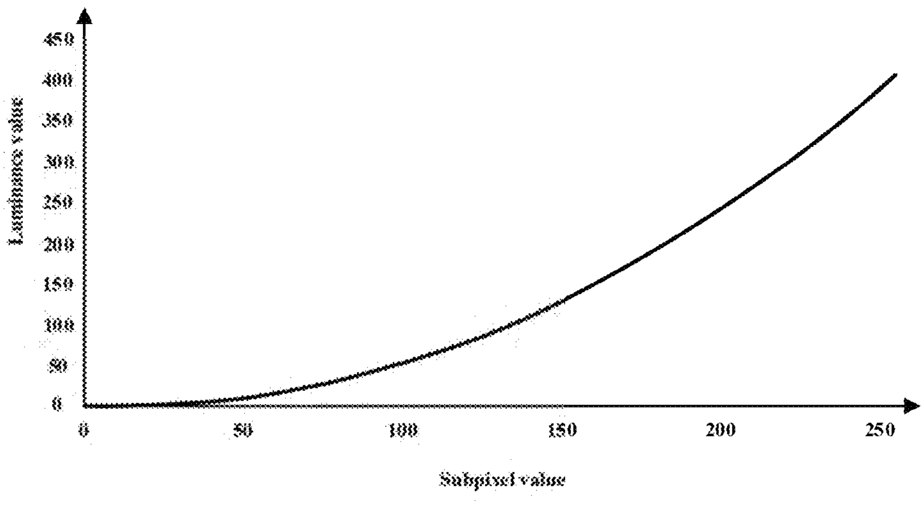
FIG. 4B shows a correlation between luminance values and subpixel values for a second subpixel of a second color in some embodiments according to the present disclosure.

The gamma values for different color subpixels (such as red, green, and blue) can be different because the response of the human eye to different colors of light is not the same. FIG. 4A shows a correlation between luminance values and subpixel values for a first subpixel of a first color in some embodiments according to the present disclosure. FIG. 4B shows a correlation between luminance values and subpixel values for a second subpixel of a second color in some embodiments according to the present disclosure. In one example, the first color is a blue color, the second color is a white color. In another example, the first subpixel is a blue subpixel, and the second subpixel is a white subpixel. As shown in FIGS. 4A and 4B, with respect to a same subpixel value, the first subpixel of the first color has a much smaller corresponding luminance value as compare to the second subpixel of the second color.

In some embodiments, the method further includes reducing at least a first luminance value of a first subpixel in the respective pixel to a first adjusted luminance value; increasing at least a second luminance value of a second subpixel in the respective pixel to a second adjusted luminance value, wherein, to achieve a same luminance value, the second subpixel requires a smaller subpixel value as compared to the first subpixel. By reducing at least the first luminance value of the first subpixel in the respective pixel to the first adjusted luminance value, and increasing at least the second luminance value of the second subpixel in the respective pixel to the second adjusted luminance value, image retention caused by displaying the static image at a same position for an extended period time can be reduced or obviated.

In some embodiments, subsequent to reducing at least the first luminance value of the first subpixel in the respective pixel to the first adjusted luminance value, and increasing at least the second luminance value of the second subpixel in the respective pixel to the second adjusted luminance value, a total luminance value of the subpixels of the respective pixel remains substantially the same. As used herein, the term "substantially the same" refers to a difference between two values not exceeding 10% of a base value (e.g., one of the two values), e.g., not exceeding 8%, not exceeding 6%, not exceeding 4%, not exceeding 2%, not exceeding 1%, not exceeding 0.5%, not exceeding 0.1%, not exceeding 0.05%, and not exceeding 0.01%, of the base value. For example, a reduced luminance value of the at least the first subpixel is substantially the same as an increased luminance value of the at least second subpixel.

In some embodiments, the method further includes converting adjusted luminance values of subpixels in the respective pixel in the static image into adjusted subpixel values of subpixels in the respective pixel in the static image; and displaying the static image using the adjusted subpixel values. For example, the method further includes converting the first adjusted luminance value into a first adjusted subpixel value and converting the second adjusted luminance value into a second adjusted subpixel value, and displaying the static image using the first adjusted subpixel value for the first subpixel and the second adjusted subpixel value for the second subpixel.

Figure 5:
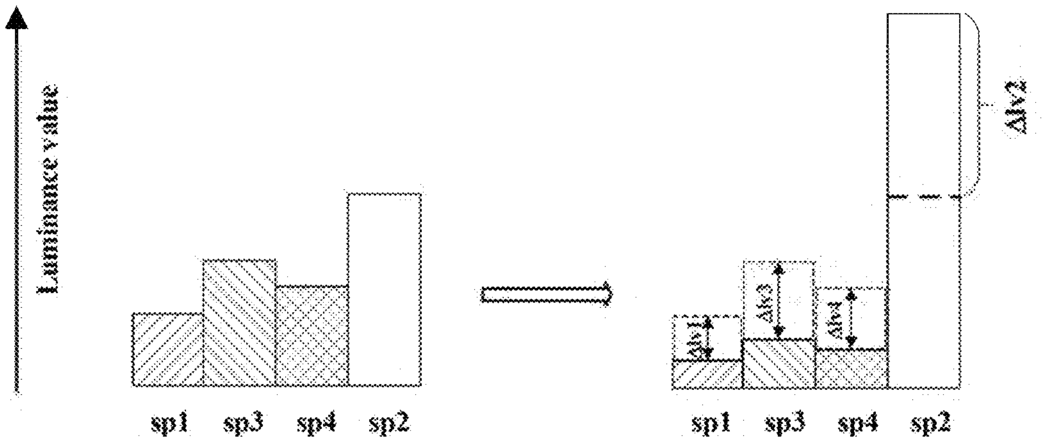
FIG. 5 is a diagram illustrating luminance values of subpixels in a respective pixel in some embodiments according to the present disclosure.
Figure 6:
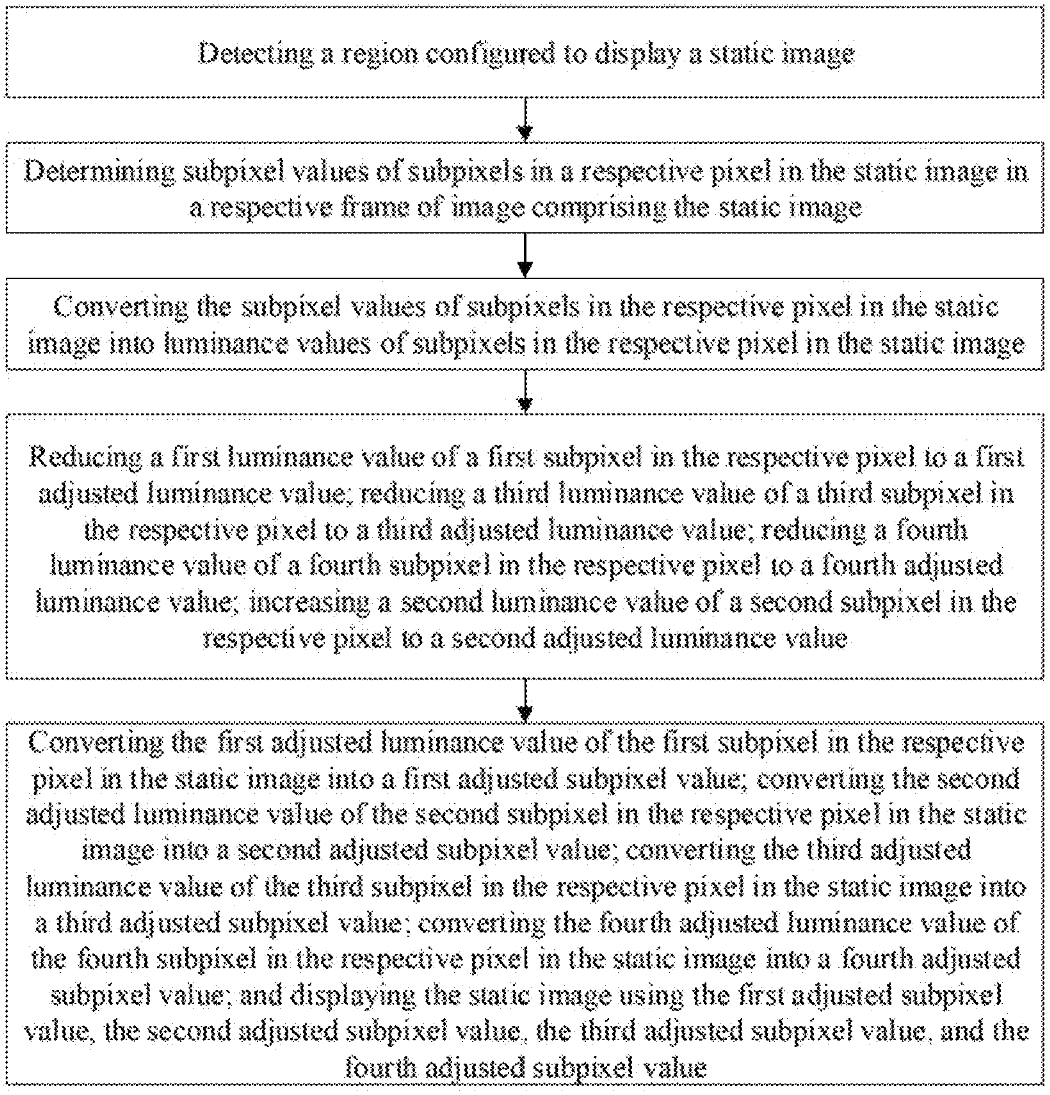
FIG. 6 is a flow chart illustrating a method of displaying an image in some embodiments according to the present disclosure.

Various appropriate implementations may be practiced according to the present disclosure. FIG. 5 is a diagram illustrating luminance values of subpixels in a respective pixel in some embodiments according to the present disclosure. FIG. 6 is a flow chart illustrating a method of displaying an image in some embodiments according to the present disclosure. Referring to FIGS. 5 and 6, the method of displaying an image in some embodiments includes detecting a region configured to display a static image; determining subpixel values of subpixels in a respective pixel in the static image in a respective frame of image comprising the static image; determining subpixel values of subpixels in a respective pixel in the static image in a respective frame of image comprising the static image; converting the subpixel values of subpixels in the respective pixel in the static image into luminance values of subpixels in the respective pixel in the static image; reducing a first luminance value of a first subpixel sp1 in the respective pixel to a first adjusted luminance value, reducing a third luminance value of a third subpixel sp3 in the respective pixel to a third adjusted luminance value; reducing a fourth luminance value of a fourth subpixel sp4 in the respective pixel to a fourth adjusted luminance value; increasing a second luminance value of a second subpixel sp2 in the respective pixel to a second adjusted luminance value; convening the first adjusted luminance value of the first subpixel sp1 in the respective pixel in the static image into a first adjusted subpixel value; converting the second adjusted luminance value of the second subpixel sp2 in the respective pixel in the static image into a second adjusted subpixel value; converting the third adjusted luminance value of the third subpixel sp3 in the respective pixel in the static image into a third adjusted subpixel value; converting the fourth adjusted luminance value of the fourth subpixel sp4 in the respective pixel in the static image into a fourth adjusted subpixel value; and displaying the static image using the first adjusted subpixel value, the second adjusted subpixel value, the third adjusted subpixel value, and the fourth adjusted subpixel value.

In some embodiments, to achieve a same luminance value, the second subpixel requires a smaller subpixel value as compared to the first subpixel. Optionally, to achieve a same luminance value, the third subpixel requires a smaller subpixel value as compared to the first subpixel. Optionally, to achieve a same luminance value, the fourth subpixel requires a smaller subpixel value as compared to the first subpixel.

Referring to FIG. 5, in some embodiments, the first luminance value of the first subpixel sp1 in the respective pixel is reduced by a first luminance difference Δ1*v*1 to obtain the first adjusted luminance value, the third luminance value of the third subpixel sp3 in the respective pixel is reduced by a third luminance difference Δ1*v*3 to obtain the third adjusted luminance value, the fourth luminance value of the fourth subpixel sp4 in the respective pixel is reduced by a fourth luminance difference Δ1*v*4 to obtain the fourth adjusted luminance value, and the second luminance value of the second subpixel sp2 in the respective pixel is increased by a second luminance difference Δ1*v*2 to obtain the second adjusted luminance value.

In some embodiments, the second luminance difference Δ1*v*2 is substantially the same as a sum of the first luminance difference Δ1*v*1, the third luminance difference Δ1*v*3, and the fourth luminance difference Δ1*v*4. By having the second luminance difference Δ1*v*2 substantially the same as the sum of the first luminance difference Δ1*v*1, the third luminance difference Δ1*v*3, and the fourth luminance difference Δ1*v*4, a total luminance value of the respective pixel remains substantially the same.

In some embodiments, a first ratio of the first luminance difference Δ1*v*1 to the first luminance value is substantially the same as a second ratio of the third luminance difference Δ1*v*3 to the third luminance value, and is substantially the same as a third ratio of the fourth luminance difference Δ1*v*4 to the fourth luminance value. The inventors of the present disclosure discover that, by having the first ratio, the second ratio, and the third ratio substantially the same, color shift may be obviated when displaying the static image.

In alternative embodiments, at least two of the first ratio of the first luminance difference Δ1*v*1 to the first luminance value, the second ratio of the third luminance difference Δ1*v*3 to the third luminance value, and the third ratio of the fourth luminance difference Δ1*v*4 to the fourth luminance value are different from each other, e.g., by at least 10%, by at least 15% by at least 20%, or by at least 35%. Optionally, the first ratio of the first luminance difference Δ1*v*1 to the first luminance value, the second ratio of the third luminance difference Δ1*v*3 to the third luminance value, and the third ratio of the fourth luminance difference Δ1*v*4 to the fourth luminance value are different from each other.

In some embodiments, a fourth ratio of the first adjusted luminance value to the first luminance value is substantially the same as a fifth ratio of the third adjusted luminance value to the third luminance value, and is substantially the same as a sixth ratio of the fourth adjusted luminance value to the fourth luminance value. The inventors of the present disclosure discover that, by having the fourth ratio, the fifth ratio, and the sixth ratio substantially the same, color shift may be obviated when displaying the static image.

In alternative embodiments, at least two of the fourth ratio of the first adjusted luminance value to the first luminance value, the fifth ratio of the third adjusted luminance value to the third luminance value, and the sixth ratio of the fourth adjusted luminance value to the fourth luminance value are different from each other, e.g., by at least 10%, by at least 15%, by at least 20%, or by at least 35%. Optionally, the fourth ratio of the first adjusted luminance value to the first luminance value, the fifth ratio of the third adjusted luminance value to the third luminance value, and the sixth ratio of the fourth adjusted luminance value to the fourth luminance value are different from each other.

In some embodiments, the first ratio, the second ratio, and the third ratio are in a range of 1:10 to 9:10, e.g., 1.10 to 2:10, 2:10 to 3:10, 3:10 to 4:10, 4:10 to 5:10, 5:10 to 6:10, 6:10 to 7:10, 7:10 to 8:10, or 8:10 to 9:10. Optionally, the first ratio, the second ratio, and the third ratio are in a range of 6:10 to 8:10. In one example, the first ratio, the second ratio, and the third ratio are 7:10.

In some embodiments, the fourth ratio, the fifth ratio, and the sixth ratio are in a range of 1:10 to 9:10, e.g., 1:10 to 2:10, 2:10 to 3:10, 3:10 to 4:10, 4:10 to 5:10, 5:10 to 6:10, 6:10 to 7:10, 7:10 to 8:10, or 8:10 to 9:10. Optionally, the fourth ratio, the fifth ratio, and the sixth ratio are in a range of 2:10 to 4:10. In one example, the fourth ratio, the fifth ratio, and the sixth ratio are 3:10.

In some embodiments, the first subpixel is a subpixel of a first color, the second subpixel is a subpixel of a second color, the third subpixel is a subpixel of a third color, and the fourth subpixel is a subpixel of a fourth color. In one example, the first color is a blue color, the second color is a white color, the third color is a red color, and the fourth color is a green color.

Figure 7:
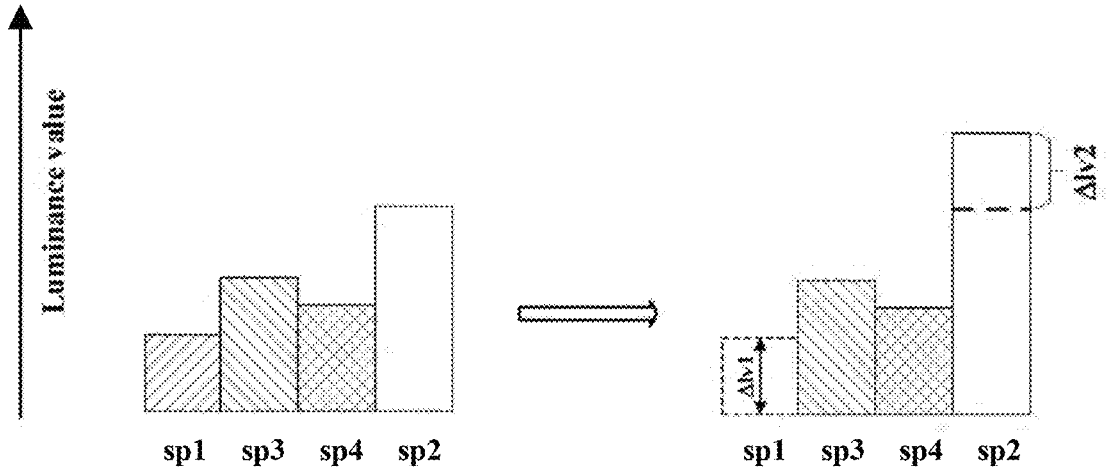
FIG. 7 is a diagram illustrating luminance values of subpixels in a respective pixel in some embodiments according to the present disclosure.
Figure 8:
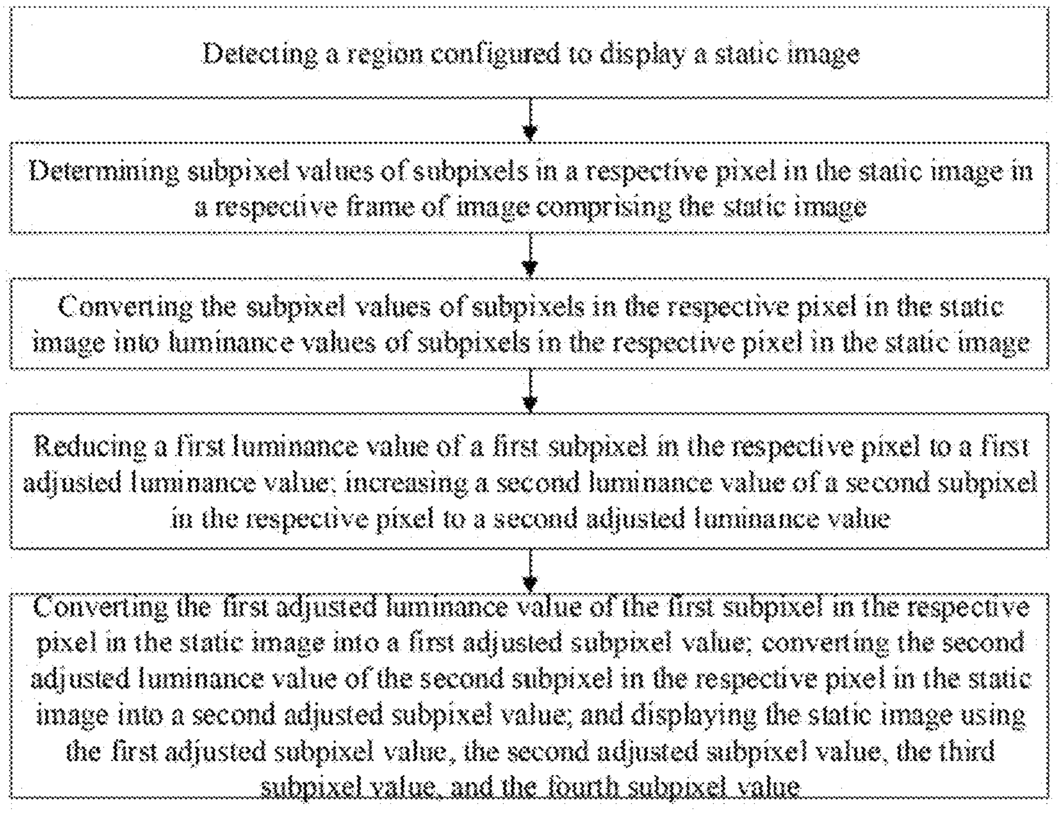
FIG. 8 is a flow chart illustrating a method of displaying an image in some embodiments according to the present disclosure.

FIG. 7 is a diagram illustrating luminance values of subpixels in a respective pixel in some embodiments according to the present disclosure. FIG. 8 is a flow chart illustrating a method of displaying an image in some embodiments according to the present disclosure. Referring to FIGS. 7 and 8, the method of displaying an image in some embodiments includes detecting a region configured to display a static image; determining subpixel values of subpixels in a respective pixel in the static image in a respective frame of image comprising the static image; determining subpixel values of subpixels in a respective pixel in the static image in a respective frame of image comprising the static image; converting the subpixel values of subpixels in the respective pixel in the static image into luminance values of subpixels in the respective pixel in the static image; reducing a first luminance value of a first subpixel sp1 in the respective pixel to a first adjusted luminance value; increasing a second luminance value of a second subpixel sp2 in the respective pixel to a second adjusted luminance value; converting the first adjusted luminance value of the first subpixel sp1 in the respective pixel in the static image into a first adjusted subpixel value; convening the second adjusted luminance value of the second subpixel sp2 in the respective pixel in the static image into a second adjusted subpixel value; and displaying the static image using the first adjusted subpixel value, the second adjusted subpixel value, the third subpixel value, and the fourth subpixel value.

In some embodiments, to achieve a same luminance value, the second subpixel requires a smaller subpixel value as compared to the first subpixel.

Referring to FIG. 7, in some embodiments, the first luminance value of the first subpixel sp1 in the respective pixel is reduced by a first luminance difference Δ1*v*1 to obtain the first adjusted luminance value, and the second luminance value of the second subpixel sp2 in the respective pixel is increased by a second luminance difference Δ1*v*2 to obtain the second adjusted luminance value.

In some embodiments, the second luminance difference Δ1*v*2 is substantially the same as the first luminance difference Δ1*v*1. By having the second luminance difference Δ1*v*2 substantially the same as the first luminance difference Δ1*v*1, a total luminance value of the respective pixel remains substantially the same.

In some embodiments, a first ratio of the first luminance difference Δ1*v*1 to the first luminance value is in a range of 1:10 to 1:1, e.g., 1:10 to 2:10, 2:10 to 3:10, 3:10 to 4.10, 4:10 to 5:10, 5:10 to 6:10, 6:10 to 7:10, 7:10 to 8:10, 8:10 to 9:10, or 9:10 to 1:1. Optionally, the first ratio is in a range of 9:10 to 1:1. In one example, the first ratio is 1:1, e.g., the first adjusted luminance value is 0.

In some embodiments, the first subpixel is a subpixel of a first color, the second subpixel is a subpixel of a second color. In alternative embodiments, the first subpixel is a subpixel of a third color, the second subpixel is a subpixel of a second color. In alternative embodiments, the first subpixel is a subpixel of a fourth color, the second subpixel is a subpixel of a second color. In one example, the first color is a blue color, the second color is a white color, the third color is a red color, and the fourth color is a green color.

Figure 9:
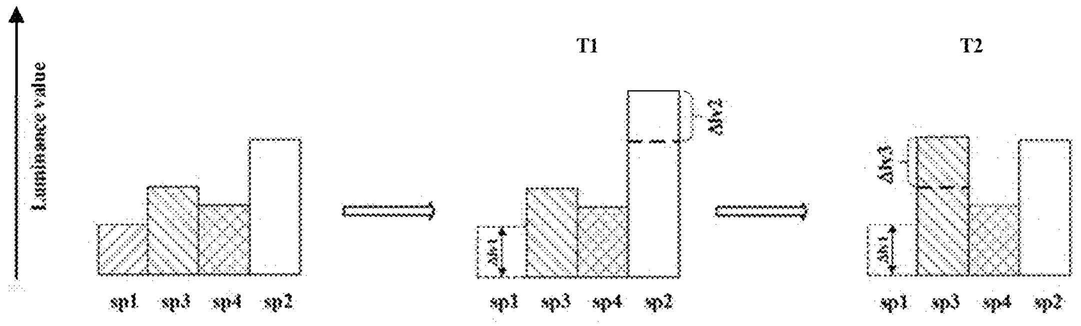
FIG. 9 is a diagram illustrating luminance values of subpixels in a respective pixel in some embodiments according to the present disclosure.
Figure 10:
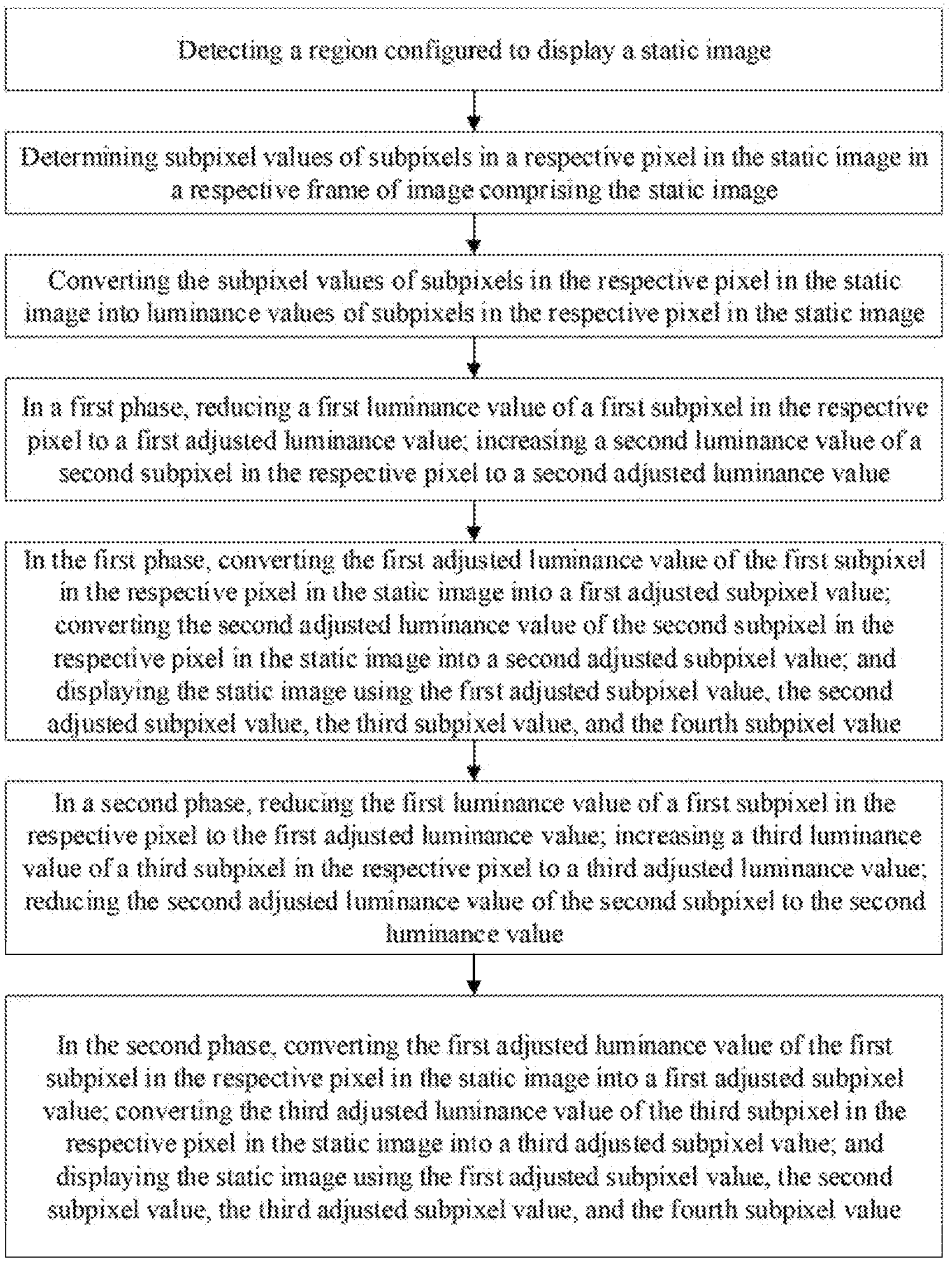
FIG. 10 is a flow chart illustrating a method of displaying an image in some embodiments according to the present disclosure.

FIG. 9 is a diagram illustrating luminance values of subpixels in a respective pixel in some embodiments according to the present disclosure. FIG. 10 is a flow chart illustrating a method of displaying an image in some embodiments according to the present disclosure. Referring to FIG. 9 and FIG. 10, the method of displaying an image in some embodiments includes detecting a region configured to display a static image; determining subpixel values of subpixels in a respective pixel in the static image in a respective frame of image comprising the static image; determining subpixel values of subpixels in a respective pixel in the static image in a respective frame of image comprising the static image, converting the subpixel values of subpixels in the respective pixel in the static image into luminance values of subpixels in the respective pixel in the static image; in a first phase T1, reducing a first luminance value of a first subpixel sp1 in the respective pixel to a first adjusted luminance value; increasing a second luminance value of a second subpixel sp2 in the respective pixel to a second adjusted luminance value, in the first phase T1, convening the first adjusted luminance value of the first subpixel sp1 in the respective pixel in the static image into a first adjusted subpixel value; converting the second adjusted luminance value of the second subpixel sp2 in the respective pixel in the static image into a second adjusted subpixel value; and displaying the static image using the rust adjusted subpixel value, the second adjusted subpixel value, the third subpixel value, and the fourth subpixel value; in a second phase T2, reducing the first luminance value of the first subpixel sp1 in the respective pixel to the first adjusted luminance value; increasing a third luminance value of a third subpixel sp3 in the respective pixel to a third adjusted luminance value; reducing the second adjusted luminance value of the second subpixel sp2 to the second luminance value; in the second phase T2, convening the first adjusted luminance value of the first subpixel sp1 in the respective pixel in the static image into a first adjusted subpixel value; converting the third adjusted luminance value of the third subpixel sp3 in the respective pixel in the static image into a third adjusted subpixel value; and displaying the static image using the first adjusted subpixel value, the second subpixel value, the third adjusted subpixel value, and the fourth subpixel value.

The inventors of the present disclosure discover that, by having the first phase T1 and the second phase T2, the luminance values of two different subpixels are alternately increased, avoiding the issue of image retention in any one of the subpixels that has an increased luminance value.

In some embodiments, to achieve a same luminance value, the second subpixel requires a smaller subpixel value as compared to the first subpixel. Optionally, to achieve a same luminance value, the third subpixel requires a smaller subpixel value as compared to the first subpixel.

Referring to FIG. 9, in the first phase T1, the first luminance value of the first subpixel sp1 in the respective pixel is reduced by a first luminance difference Δ1*v*1 to obtain the first adjusted luminance value, and the second luminance value of the second subpixel sp2 in the respective pixel is increased by a second luminance difference Δ1*v*2 to obtain the second adjusted luminance value.

In some embodiments, in the first phase T1, the second luminance difference Δ1*v*2 is substantially the same as the first luminance difference Δ1*v*1. By having the second luminance difference Δ1*v*2 substantially the same as the first luminance difference Δ1*v*1, a total luminance value of the respective pixel remains substantially the same.

In some embodiments, in the first phase T1, a first ratio of the first luminance difference Δ1*v*1 to the first luminance value is in a range of 1:10 to 1:1, e.g., 1:10 to 2:10, 2:10 to 3:10, 3:10 to 4:10, 4:10 to 5:10, 5:10 to 6:10, 6:10 to 7:10, 7:10 to 8:10, 8:10 to 9:10, or 9:10 to 1:1. Optionally, the first ratio is in a range of 9:10 to 1:1. In one example, the first ratio is 1:1, e.g., the first adjusted luminance value is 0.

Referring to FIG. 9, in the second phase T2, the first luminance value of the first subpixel sp1 in the respective pixel is reduced by a first luminance difference Δ1*v*1 to obtain the first adjusted luminance value, and the third luminance value of the third subpixel sp3 in the respective pixel is increased by a third luminance difference Δ1*v*3 to obtain the third adjusted luminance value.

In some embodiments, in the second phase T2, the third luminance difference Δ1*v*3 is substantially the same as the first luminance difference Δ1*v*1. By having the third luminance difference Δ1*v*3 substantially the same as the first luminance difference ΔA1*v*1, a total luminance value of the respective pixel remains substantially the same.

In some embodiments, in the second phase T2, a first ratio of the first luminance difference Δ1*v*1 to the first luminance value is in a range of 1:10 to 1.1, e.g., 1:10 to 2:10, 2:10 to 3:10, 3:10 to 4:10, 4:10 to 5:10, 5:10 to 6:10, 6.10 to 7:10, 7:10 to 8:10, 8.10 to 9:10, or 9:10 to 1:1. Optionally, the first ratio is in a range of 9:10 to 1:1. In one example, the first ratio is 1:1, e.g., the first adjusted luminance value is 0.

In some embodiments, the first subpixel is a subpixel of a first color, the second subpixel is a subpixel of a second color, the third subpixel is a subpixel of a third color, and the fourth subpixel is a subpixel of a fourth color. In one example, the first color is a blue color, the second color is a white color, the third color is a red color, and the fourth color is a green color.

Figure 11:
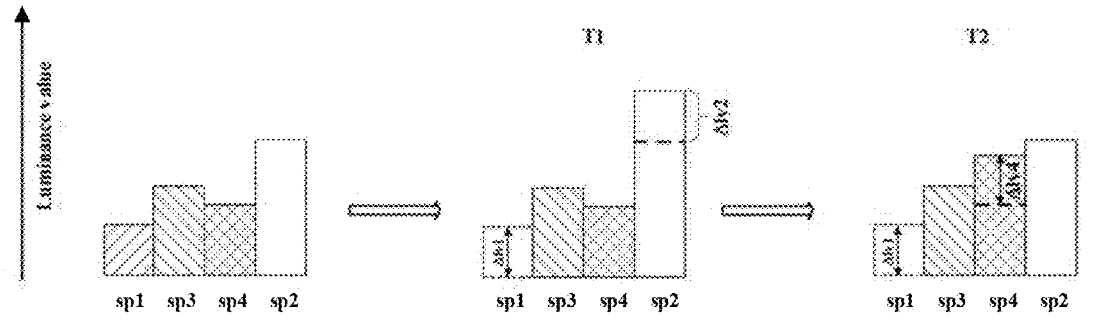
FIG. 11 is a diagram illustrating luminance values of subpixels in a respective pixel in some embodiments according to the present disclosure.
Figure 12:
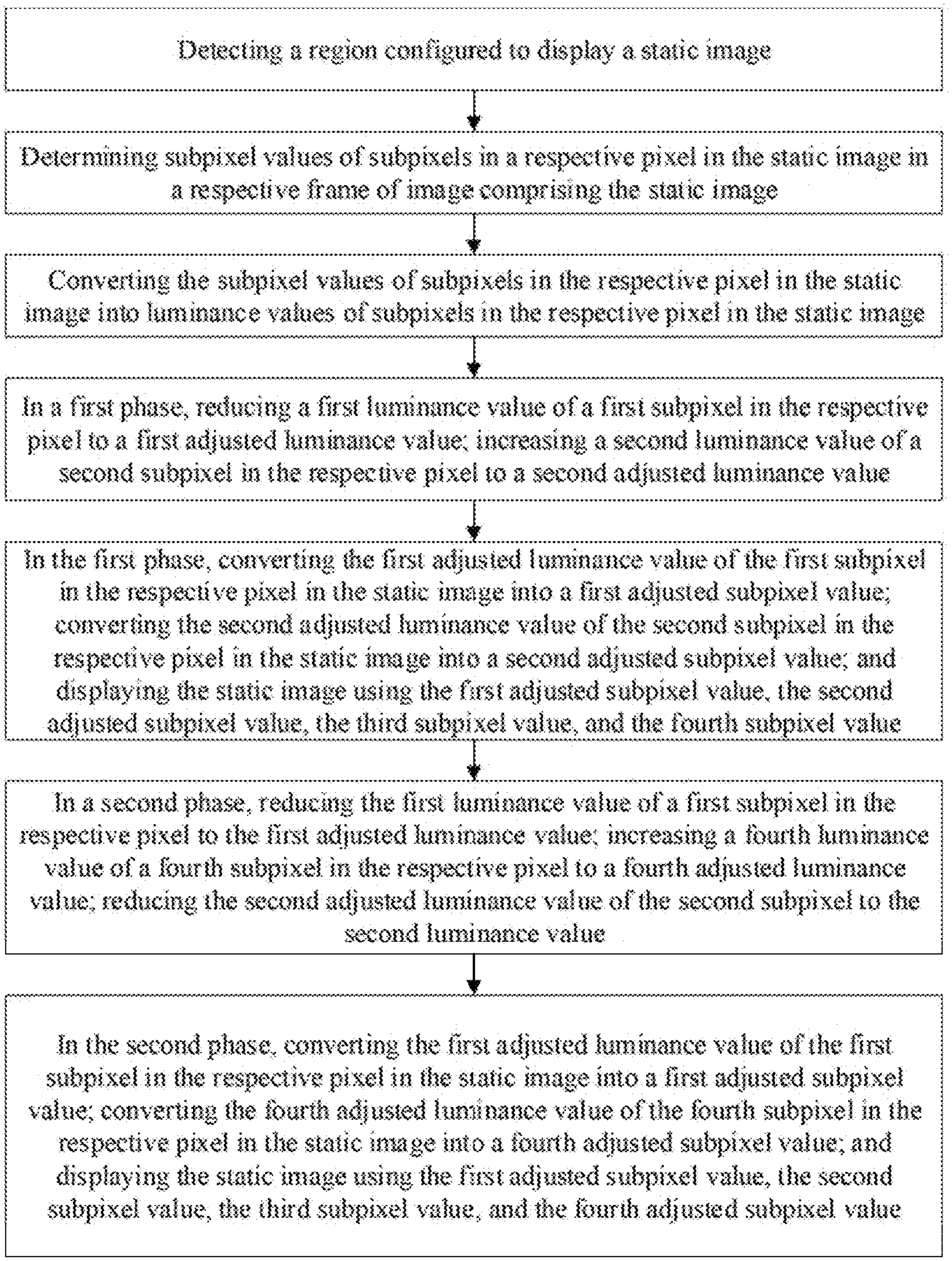
FIG. 12 is a flow chart illustrating a method of displaying an image in some embodiments according to the present disclosure.

FIG. 11 is a diagram illustrating luminance values of subpixels in a respective pixel in some embodiments according to the present disclosure. FIG. 12 is a flow chart illustrating a method of displaying an image in some embodiments according to the present disclosure. Referring to FIG. 1l and FIG. 12, the method of displaying an image in some embodiments includes detecting a region configured to display a static image; determining subpixel values of subpixels in a respective pixel in the static image in a respective frame of image comprising the static image; determining subpixel values of subpixels in a respective pixel in the static image in a respective frame of image comprising the static image; converting the subpixel values of subpixels in the respective pixel in the static image into luminance values of subpixels in the respective pixel in the static image; in a first phase T1, reducing a first luminance value of a first subpixel sp1 in the respective pixel to a first adjusted luminance value; increasing a second luminance value of a second subpixel sp2 in the respective pixel to a second adjusted luminance value; in the first phase T1, converting the first adjusted luminance value of the first subpixel sp1 in the respective pixel in the static image into a first adjusted subpixel value; converting the second adjusted luminance value of the second subpixel sp2 in the respective pixel in the static image into a second adjusted subpixel value; and displaying the static image using the first adjusted subpixel value, the second adjusted subpixel value, the third subpixel value, and the fourth subpixel value; in a second phase T2, reducing the first luminance value of the first subpixel sp1 in the respective pixel to the first adjusted luminance value; increasing a fourth luminance value of a fourth subpixel sp4 in the respective pixel to a fourth adjusted luminance value; reducing the second adjusted luminance value of the second subpixel sp2 to the second luminance value; in the second phase T2, converting the first adjusted luminance value of the first subpixel sp1 in the respective pixel in the static image into a first adjusted subpixel value; converting the fourth adjusted luminance value of the fourth subpixel sp4 in the respective pixel in the static image into a fourth adjusted subpixel value; and displaying the static image using the first adjusted subpixel value, the second subpixel value, the third subpixel value, and the fourth adjusted subpixel value.

The inventors of the present disclosure discover that, by having the first phase T1 and the second phase T2, the luminance values of two different subpixels are alternately increased, avoiding the issue of image retention in any one of the subpixels that has an increased luminance value.

In some embodiments, to achieve a same luminance value, the second subpixel requires a smaller subpixel value as compared to the first subpixel. Optionally, to achieve a same luminance value, the fourth subpixel requires a smaller subpixel value as compared to the first subpixel.

Referring to FIG. 11, in the first phase T1, the first luminance value of the first subpixel sp1 in the respective pixel is reduced by a first luminance difference Δ1*v*1 to obtain the first adjusted luminance value, and the second luminance value of the second subpixel sp2 in the respective pixel is increased by a second luminance difference Δ1*v*2 to obtain the second adjusted luminance value.

In some embodiments, in the first phase T1, the second luminance difference Δ1*v*2 is substantially the same as the first luminance difference Δ1*v*1. By having the second luminance difference Δ1*v*2 substantially the same as the first luminance difference Δ1*v*1, a total luminance value of the respective pixel remains substantially the same.

In some embodiments, in the first phase T1, a first ratio of the first luminance difference Δ1*v*1 to the first luminance value is in a range of 1:10 to 1:1, e.g., 1:10 to 2:10, 2:10 to 3:10, 3:10 to 4:10, 4:10 to 5:10, 5:10 to 6:10, 6:10 to 7:10, 7:10 to 8:10, 8:10 to 9:10, or 9:10 to 1:1. Optionally, the first ratio is in a range of 9:10 to 1:1. In one example, the first ratio is 1:1. e.g., the first adjusted luminance value is 0.

Referring to FIG. 11, in the second phase T2, the first luminance value of the first subpixel sp1 in the respective pixel is reduced by a first luminance difference Δ1*v*1 to obtain the first adjusted luminance value, and the fourth luminance value of the fourth subpixel sp4 in the respective pixel is increased by a fourth luminance difference Δ1*v*4 to obtain the fourth adjusted luminance value.

In some embodiments, in the second phase T2, the fourth luminance difference Δ1*v*4 is substantially the same as the first luminance difference Δ1*v*1. By having the fourth luminance difference Δ1*v*4 substantially the same as the first luminance difference Δ1*v*1, a total luminance value of the respective pixel remains substantially the same.

In some embodiments, in the second phase T2, a first ratio of the first luminance difference Δ1*v*1 to the first luminance value is in a range of 1:10 to 1:1, e.g., 1:10 to 2:10, 2:10 to 3.10, 3:10 to 4:10, 4:10 to 5:10, 5:10 to 6:10, 6:10 to 7:10, 7:10 to 8:10, 8:10 to 9:10, or 9:10 to 1:1. Optionally, the first ratio is in a range of 9:10 to 1:1. In one example, the first ratio is 1:1, e.g., the first adjusted luminance value is 0.

In some embodiments, the first subpixel is a subpixel of a first color, the second subpixel is a subpixel of a second color, the third subpixel is a subpixel of a third color, and the fourth subpixel is a subpixel of a fourth color. In one example, the first color is a blue color, the second color is a white color, the third color is a red color, and the fourth color is a green color.

Figure 13:
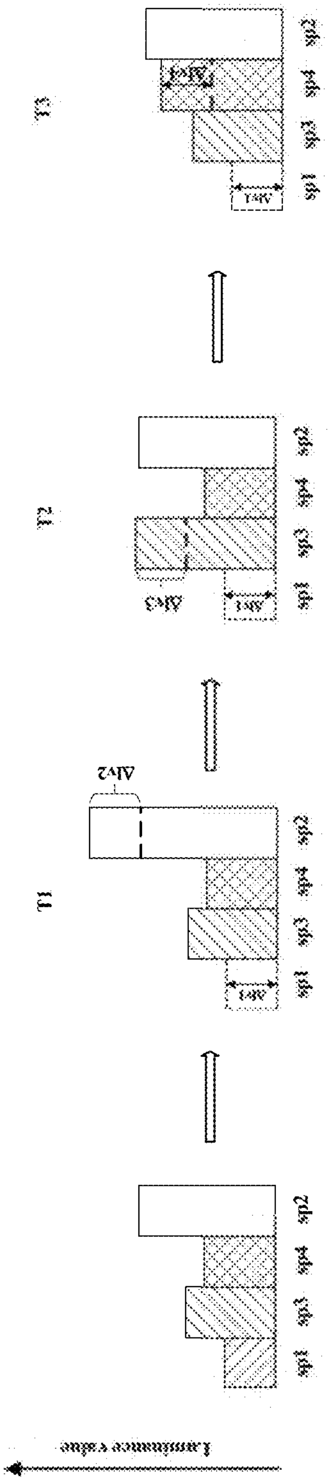
FIG. 13 is a diagram illustrating luminance values of subpixels in a respective pixel in some embodiments according to the present disclosure.
Figure 14:
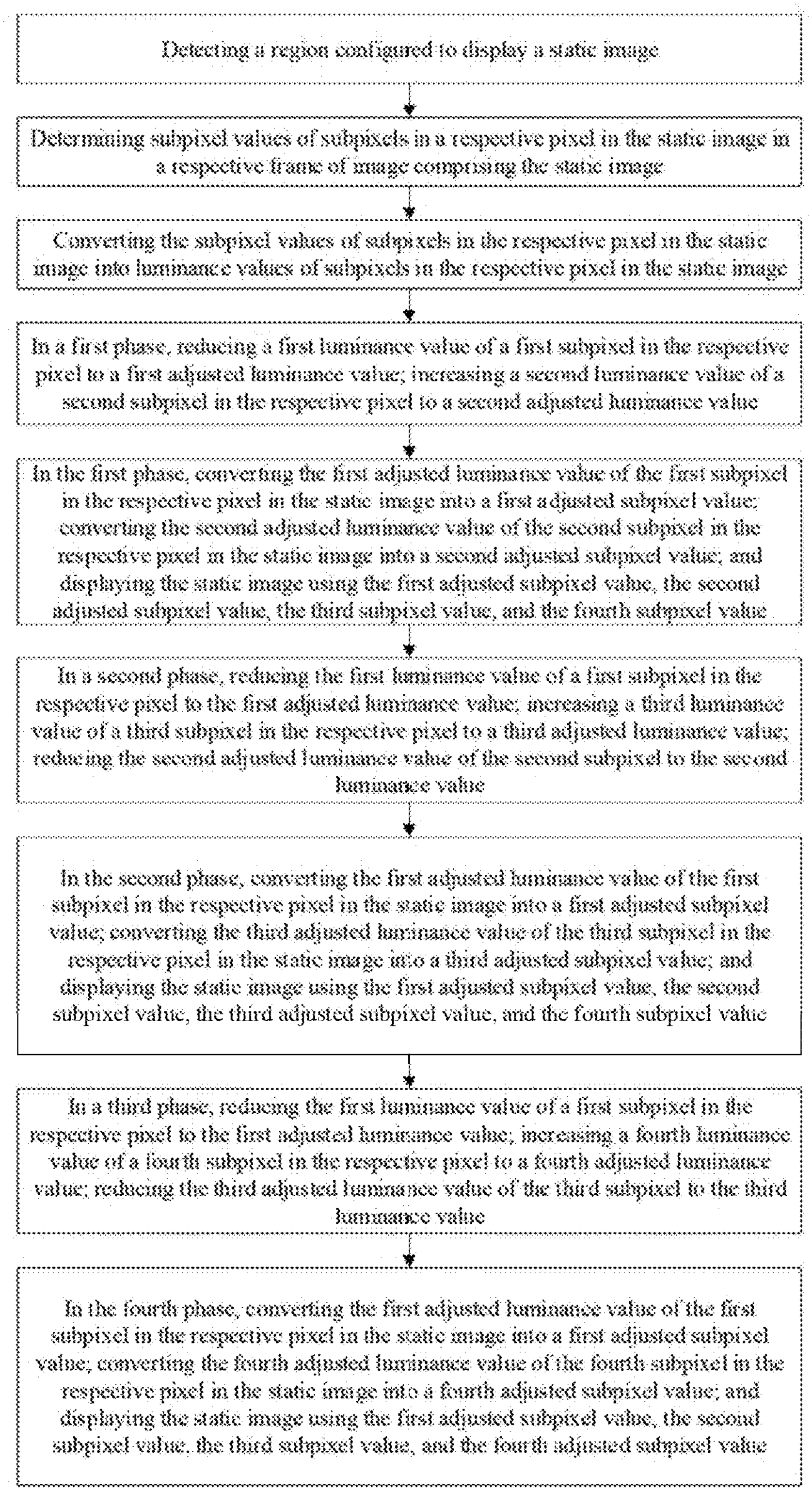
FIG. 14 is a flow chap illustrating a method of displaying an image in some embodiments according to the present disclosure.

FIG. 13 is a diagram illustrating luminance values of subpixels in a respective pixel in some embodiments according to the present disclosure. FIG. 14 is a flow chart illustrating a method of displaying an image in some embodiments according to the present disclosure. Referring to FIGS. 13 and 14, the method of displaying an image in some embodiments includes detecting a region configured to display a static image; determining subpixel values of subpixels in a respective pixel in the static image in a respective frame of image comprising the static image; determining subpixel values of subpixels in a respective pixel in the static image in a respective frame of image comprising the static image; converting the subpixel values of subpixels in the respective pixel in the static image into luminance values of subpixels in the respective pixel in the static image; in a first phase T1, reducing a first luminance value of a first subpixel sp1 in the respective pixel to a first adjusted luminance value; increasing a second luminance value of a second subpixel sp2 in the respective pixel to a second adjusted luminance value; in the first phase T1, converting the first adjusted luminance value of the first subpixel sp1 in the respective pixel in the static image into a first adjusted subpixel value; converting the second adjusted luminance value of the second subpixel sp2 in the respective pixel in the static image into a second adjusted subpixel value; and displaying the static image using the first adjusted subpixel value, the second adjusted subpixel value, the third subpixel value, and the fourth subpixel value; in a second phase T2, reducing the first luminance value of the first subpixel sp1 in the respective pixel to the first adjusted luminance value; increasing a third luminance value of a third subpixel sp3 in the respective pixel to a third adjusted luminance value, reducing the second adjusted luminance value of the second subpixel sp2 to the second luminance value; in the second phase T2, converting the first adjusted luminance value of the first subpixel sp1 in the respective pixel in the static image into a first adjusted subpixel value; convening the third adjusted luminance value of the third subpixel sp3 in the respective pixel in the static image into a third adjusted subpixel value; and displaying the static image using the first adjusted subpixel value, the second subpixel value, the third adjusted subpixel value, and the fourth subpixel value; in a third phase T3, reducing the first luminance value of the first subpixel sp1 in the respective pixel to the first adjusted luminance value; increasing a fourth luminance value of a fourth subpixel sp4 in the respective pixel to a fourth adjusted luminance value; reducing the third adjusted luminance value of the third subpixel sp3 to the third luminance value; in the third phase T3, converting the first adjusted luminance value of the first subpixel sp1 in the respective pixel in the static image into a first adjusted subpixel value; converting the fourth adjusted luminance value of the fourth subpixel sp4 in the respective pixel in the static image into a fourth adjusted subpixel value; and displaying the static image using the first adjusted subpixel value, the second subpixel value, the third subpixel value, and the fourth adjusted subpixel value.

The inventors of the present disclosure discover that, by having the first phase T1, the second phase T2, and the third phase T3, the luminance values of different subpixels are alternately increased, avoiding the issue of image retention in any one of the subpixels that has an increased luminance value.

In some embodiments, to achieve a same luminance value, the second subpixel requires a smaller subpixel value as compared to the first subpixel. Optionally, to achieve a same luminance value, the third subpixel requires a smaller subpixel value as compared to the first subpixel. Optionally, to achieve a same luminance value, the fourth subpixel requires a smaller subpixel value as compared to the first subpixel.

Referring to FIG. 13, in the first phase T1, the first luminance value of the first subpixel sp1 in the respective pixel is reduced by a first luminance difference Δ1*v*1 to obtain the first adjusted luminance value, and the second luminance value of the second subpixel sp2 in the respective pixel is increased by a second luminance difference Δ1*v*2 to obtain the second adjusted luminance value.

In some embodiments, in the first phase T1, the second luminance difference Δ1*v*2 is substantially the same as the first luminance difference Δ1*v*1. By having the second luminance difference Δ1*v*2 substantially the same as the first luminance difference Δ1*v*1, a total luminance value of the respective pixel remains substantially the same.

In some embodiments, in the first phase T1, a first ratio of the first luminance difference Δ1v1 to the first luminance value is in a range of 1:10 to 1:1, e.g., 1:10 to 2:10, 2:10 to 3:10, 3:10 to 4:10, 4:10 to 5:10, 5:10 to 6:10, 6:10 to 7:10, 7:10 to 8:10, 8:10 to 9:10, or 9:10 to 1:1. Optionally, the first ratio is in a range of 9:10 to 1:1. In one example, the first ratio is 1:1, e.g., the first adjusted luminance value is 0.

Referring to FIG. 13, in the second phase T2, the first luminance value of the first subpixel sp1 in the respective pixel is reduced by a first luminance difference Δ1v1 to obtain the first adjusted luminance value, and the third luminance value of the third subpixel sp3 in the respective pixel is increased by a third luminance difference Δ1v3 to obtain the third adjusted luminance value.

In some embodiments, in the second phase T2, the third luminance difference Δ1v3 is substantially the same as the first luminance difference Δ1v1. By having the third luminance difference Δ1v3 substantially the same as the first luminance difference Δ1v1, a total luminance value of the respective pixel remains substantially the same.

In some embodiments, in the second phase T2, a first ratio of the first luminance difference Δ1v1 to the first luminance value is in a range of 1:10 to 1:1, e.g., 1:10 to 2:10, 2:10 to 3:10, 3:10 to 4:10, 4:10 to 5:10, 5:10 to 6:10, 6:10 to 7:10, 7:10 to 8:10, 8:10 to 9:10, or 9:10 to 1:1. Optionally, the first ratio is in a range of 9:10 to 1:1. In one example, the first ratio is 1:1, e.g., the first adjusted luminance value is 0.

Referring to FIG. 13, in the third phase T3, the first luminance value of the first subpixel sp1 in the respective pixel is reduced by a first luminance difference Δ1v1 to obtain the first adjusted luminance value, and the fourth luminance value of the fourth subpixel sp4 in the respective pixel is increased by a fourth luminance difference Δ1v4 to obtain the fourth adjusted luminance value.

In some embodiments, in the third phase T3, the fourth luminance difference Δ1v4 is substantially the same as the first luminance difference Δ1v1. By having the fourth luminance difference Δ1v4 substantially the same as the first luminance difference Δ1v1, a total luminance value of the respective pixel remains substantially the same.

In some embodiments, in the third phase T3, a first ratio of the first luminance difference Δ1v1 to the first luminance value is in a range of 1:10 to 1:1, e.g., 1:10 to 2:10, 2:10 to 3:10, 3:10 to 4:10, 4:10 to 5:10, 5:10 to 6:10, 6:10 to 7:10, 7:10 to 9:10, 8.10 to 9:10, or 9:10 to 1:1. Optionally, the first ratio is in a range of 9:10 to 1:1. In one example, the first ratio is 1:1, e.g., the first adjusted luminance value is 0.

In some embodiments, the first subpixel is a subpixel of a first color, the second subpixel is a subpixel of a second color, the third subpixel is a subpixel of a third color, and the fourth subpixel is a subpixel of a fourth color. In one example, the first color is a blue color, the second color is a white color, the third color is a red color, and the fourth color is a green color.

Figure 15:
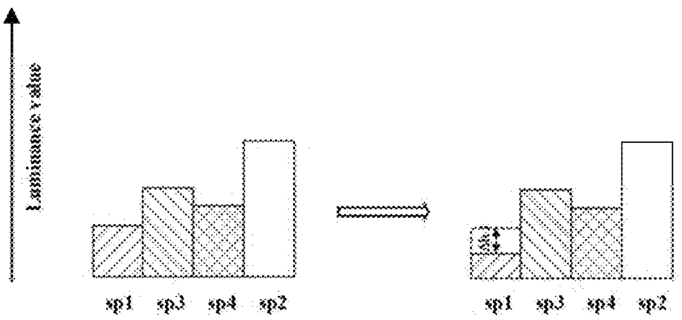
Figure 16:
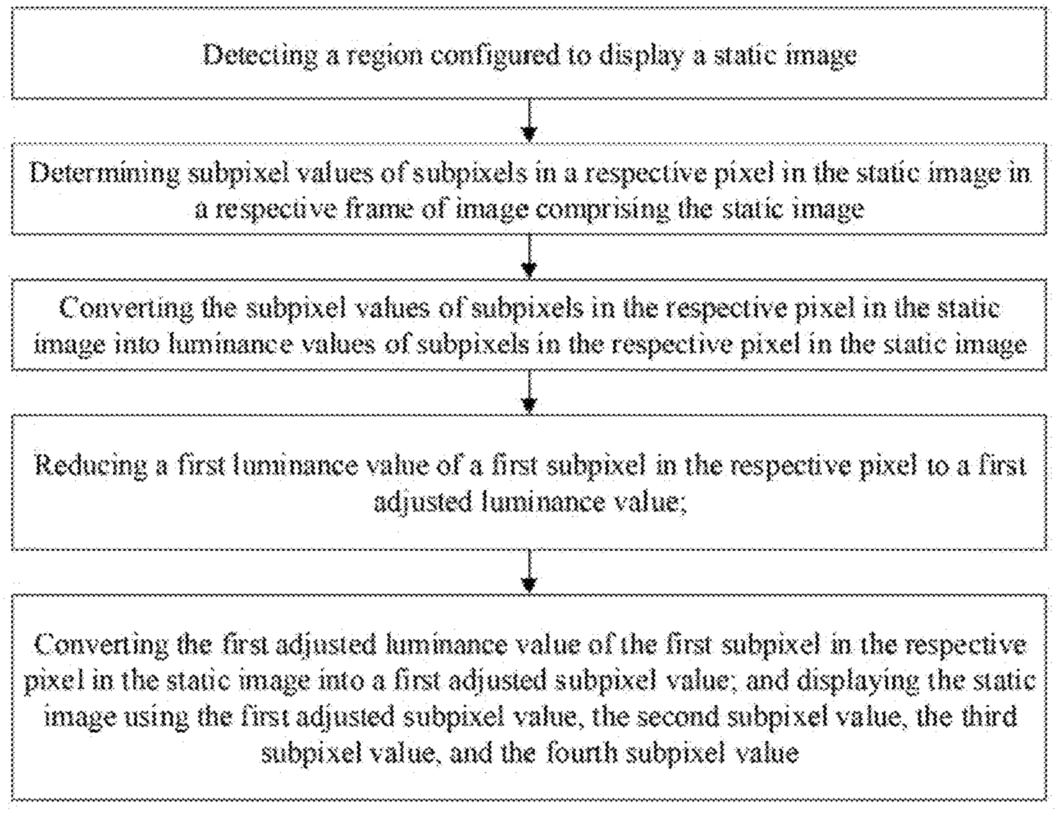
FIG. 16 is a flow chart illustrating a method of displaying an image in some embodiments according to the present disclosure.

FIG. 15 is a diagram illustrating luminance values of subpixels in a respective pixel in some embodiments according to the present disclosure. FIG. 16 is a flow chart illustrating a method of displaying an image in some embodiments according to the present disclosure. Referring to FIG. 15 and FIG. 16, the method of displaying an image in some embodiments includes detecting a region configured to display a static image; determining subpixel values of subpixels in a respective pixel in the static image in a respective frame of image comprising the static image; determining subpixel values of subpixels in a respective pixel in the static image in a respective frame of image comprising the static image; converting the subpixel values of subpixels in the respective pixel in the static image into luminance values of subpixels in the respective pixel in the static image; reducing a first luminance value of a first subpixel sp1 in the respective pixel to a first adjusted luminance value; converting the first adjusted luminance value of the first subpixel sp1 in the respective pixel in the static image into a first adjusted subpixel value; and displaying the static image using the first adjusted subpixel value, the second subpixel value, the third subpixel value, and the fourth subpixel value.

Referring to FIG. 15, in some embodiments, the first luminance value of the first subpixel sp1 in the respective pixel is reduced by a first luminance difference Δ1v1 to obtain the first adjusted luminance value, in some embodiments, a first ratio of the first luminance difference Δ1v1 to the first luminance value is in a range of 1:10 to 9:10, e.g., 1:10 to 2:10, 2:10 to 3:10, 3:10 to 4:10, 4:10 to 5:10, 5:10 to 6:10, 6:10 to 7:10, 7:10 to 8:10, or 8:10 to 9:10.

In some embodiments, the first subpixel is a subpixel of a first color. In one example, the first color is a blue color.

In some embodiments, the method of displaying an image further includes, in a first region configured to display a static image, detecting a parameter of driving transistors of subpixels of a first color in first periods, and detecting a parameter of driving transistors of subpixels of a second color in second periods, wherein the parameter of driving transistors of subpixels of the first color is detected with a first frequency, the parameter of driving transistors of subpixels of the second color is detected with a second frequency. Optionally, the first frequency is higher than the second frequency.

In some embodiments, the method further includes, in the first region configured to display the static image, detecting a parameter of driving transistors of subpixels of a third color in third periods, wherein the parameter of driving transistors of subpixels of the first color is detected with a first frequency, the parameter of driving transistors of subpixels of the second color is detected with a second frequency, the parameter of driving transistors of subpixels of the third color is detected with a third frequency. Optionally, the first frequency is higher than the second frequency, and is higher than the third frequency.

In some embodiments, the method further includes, in the first region configured to display the static image, detecting a parameter of driving transistors of subpixels of a fourth color in fourth periods, wherein the parameter of driving transistors of subpixels of the first color is detected with a first frequency, the parameter of driving transistors of subpixels of the second color is detected with a second frequency, the parameter of driving transistors of subpixels of the third color is detected with a third frequency, the parameter of driving transistors of subpixels of the fourth color is detected with a fourth frequency. Optionally, the first frequency is higher than the second frequency, is higher than the third frequency, and is higher than the fourth frequency. The inventors of the present disclosure discover that, by having the first frequency higher than the second frequency, is higher than the third frequency, and is higher than the fourth frequency, luminance values of the first subpixels of the first color can be adjusted in a timely manner, reducing image retention in the first subpixels of the first color.

In some embodiments, the second frequency, the third frequency, and the fourth frequency are substantially the same. In some embodiments, the first frequency is at least twice (e.g., three times, four times, rive times) of the second frequency, the third frequency, and the fourth frequency.

In some embodiments, a respective first period of the first periods, the respective second period of the second periods, a respective third period of the third periods, and a respective fourth period of the fourth periods are substantially the same.

In some embodiments, the first subpixels are subpixels of a first color, the second subpixels are subpixels of a second color, the third subpixels are subpixels of a third color, and the fourth subpixels are subpixels of a fourth color. In one example, the first color is a blue color, the second color is a white color, the third color is a red color, and the fourth color is a green color.

In some embodiments, each of the respective first period, the respective second period, the respective third period, and the respective fourth period is a total number of rows of subpixels in the display panel divided by a frame rate. As used herein, the term "frame rate" refers to a total number of frames of image displayed per second.

In some embodiments, the parameter is a transconductance parameter of the driving transistors. In some embodiments, the transconductance parameter of the driving transistors can be expressed as:

$$k = \frac{Id}{(Vgs - Vth)^2}$$

wherein k stands for a transconductance parameter of the driving transistor, Id stands for a driving current of the pixel driving circuit, Vgs stands for the gate-source voltage, Vth stands for the threshold voltage of the driving transistor.

Figure 17:
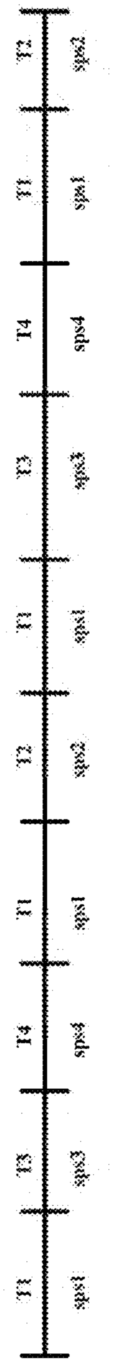
FIG. 17 illustrates a sequence of detecting a parameter of driving transistors in a display panel in some embodiments according to the present disclosure.

FIG. 17 illustrates a sequence of detecting a parameter of driving transistors in a display panel in some embodiments according to the present disclosure. Referring to FIG. 17, in a respective first period T1 of first periods, the method includes detecting a parameter of driving transistors of subpixels sps1 of a first color; in a respective second period T2 of second periods, the method includes detecting a parameter of driving transistors of subpixels sps2 of a second color; in a respective third period T3 of third periods, the method includes detecting a parameter of driving transistors of subpixels sps3 of a third color; and in a respective fourth period T4 of fourth periods, the method includes detecting a parameter of driving transistors of subpixels sps4 of a fourth color.

As shown in FIG. 17, the parameter of driving transistors of subpixels sps1 of the first color is detected with a first frequency, the parameter of driving transistors of subpixels sps2 of the second color is detected with a second frequency, the parameter of driving transistors of subpixels sps3 of the third color is detected with a third frequency, the parameter of driving transistors of subpixels sps4 of the fourth color is detected with a fourth frequency. Optionally, the first frequency is higher than the second frequency, is higher than the third frequency, and is higher than the fourth frequency. In one example depicted in FIG. 17, the first frequency is twice of the second frequency, the third frequency, and the fourth frequency.

In some embodiments, the first periods, the second periods, the third periods, and the fourth periods are arranged in a sequence. A minimal repeating sequence includes T1-T3-T4-T1-T2, wherein T1 stands for the respective first period, T2 stands for the respective second period, T3 stands for the respective third period, and T4 stands for the respective fourth period.

The inventors of the present disclosure discover that, by having the first frequency higher than the second frequency, higher than the third frequency, and higher than the fourth frequency, luminance values of the first subpixels of the first color can be adjusted in a timely manner, reducing image retention in the first subpixels of the first color.

Figure 18:
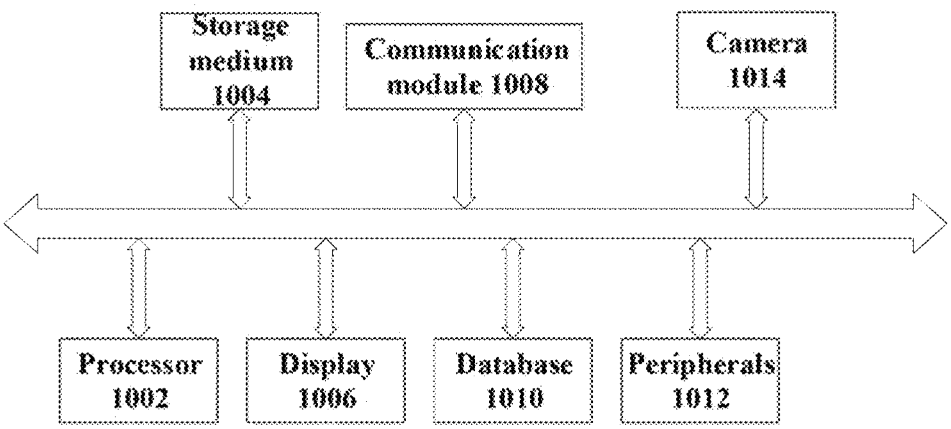
FIG. 18 is a schematic diagram illustrating a display apparatus in some embodiments according to the present disclosure.

In another aspect, the present disclosure provides a display apparatus. FIG. 18 is a schematic diagram illustrating a display apparatus in some embodiments according to the present disclosure. Referring to FIG. 18, the display apparatus may include a processor 1002, a storage medium 1004, a display 1000, a communication module 1008, a database 1010, peripherals 1012, and a camera 1014. Certain devices may be omitted, and other devices may be included to better describe the relevant embodiments. The display apparatus may include any appropriate type of display panels, such as a plasma display panel, a liquid crystal display (LCD) panel, a touch screen display panel, a projection display panel, a non-smart display panel, a smart display panel, etc. The display apparatus may also include other computing systems, such as a personal computer (PC), a tablet or mobile computer, or a smart phone, etc. In addition, the display apparatus may be any appropriate content-presentation device capable of presenting any appropriate content. Users may interact with the display apparatus to perform other activities of interest.

The processor 1002 may include any appropriate processor or processors. Further, the processor 1002 may include multiple cores for multi-thread or parallel processing. The processor 1002 may execute sequences of computer program instructions to perform various processes. The storage medium 1004 may include memory modules, such as ROM, RAM, flash memory modules, and mass storages, such as CD-ROM and hard disk, etc. The storage medium 1004 may store computer programs for implementing various processes when the computer programs are executed by the processor 1002. For example, the storage medium 1004 may store computer programs for implementing various algorithms when the computer programs are executed by the processor 1002.

Further, the communication module 1008 may include certain network interface devices for establishing connections through communication networks, such as TV cable network, wireless network, internet, etc. The database 1010 may include one or more databases for storing certain data and for performing certain operations on the stored data, such as database searching.

The display 1006 may provide information to users. The display 1006 may include any appropriate type of computer display deice or electronic apparatus display such as LCD or OLED based devices. The peripherals 1012 may include various sensors and other I/O devices, such as keyboard and mouse.

Examples of appropriate display apparatuses include, but are not limited to, an electronic paper, a mobile phone, a tablet computer, a television, a monitor, a notebook computer, a digital album, a GPS, etc. Optionally, the display apparatus is an organic light emitting diode display apparatus. Optionally, the display apparatus is a micro light emitting diode display apparatus. Optionally, the display apparatus is a mini light emitting diode display apparatus.

In some embodiments, the display apparatus includes a display panel; a memory; and one or more processors. Optionally, the memory and the one or more processors are connected with each other, and the memory stores computer-executable instructions for controlling the one or more processors to detect a region configured to display a static image in a display panel; in the first region configured to display the static image, detect a parameter of driving transistors of subpixels of a first color in first periods, and detect a parameter of driving transistors of subpixels of a second color in second periods; determine subpixel values of subpixels in a respective pixel in the static image in a respective frame of image comprising the static image; convert the subpixel values of subpixels in the respective pixel in the static image into luminance values of subpixels in the respective pixel in the static image; reduce a first luminance value of a first subpixel in the respective pixel to a first adjusted luminance value; and convert the first adjusted luminance value of the first subpixel in the respective pixel in the static image into a first adjusted subpixel value. Optionally, the parameter of driving transistors of subpixels of the first color is detected with a first frequency. Optionally, the parameter of driving transistors of subpixels of the second color is detected with a second frequency. Optionally, the first frequency is higher than the second frequency.

In some embodiments, the memory further stores computer-executable instructions for controlling the one or more processors to cause the display panel to display the static image using subpixel values including the first adjusted subpixel value and the second subpixel value.

In some embodiments, the first luminance value of the first subpixel sp1 in the respective pixel is reduced by a first luminance difference to obtain the first adjusted luminance value. Optionally, a first ratio of the first luminance difference to the first luminance value is in a range of 1:10 to 9:10.

In some embodiments, the memory further stores computer-executable instructions for controlling the one or more processors to increase at least a second luminance value of a second subpixel in the respective pixel to a second adjusted luminance value; convert adjusted luminance values of subpixels in the respective pixel in the static image into adjusted subpixel values of subpixels in the respective pixel in the static image; and cause the display panel to display the static image using the adjusted subpixel values.

In some embodiments, subsequent to reducing at least the first luminance value of the first subpixel in the respective pixel to the first adjusted luminance value, and increasing at least the second luminance value of the second subpixel in the respective pixel to the second adjusted luminance value, a total luminance value of the subpixels of the respective pixel remains substantially the same.

In some embodiments, the first luminance value of the first subpixel in the respective pixel is reduced by a first luminance difference to obtain the first adjusted luminance value; and the second luminance value of the second subpixel in the respective pixel is increased by a second luminance difference to obtain the second adjusted luminance value. Optionally, the second luminance difference is substantially the same as the first luminance difference.

In some embodiments, a first ratio of the first luminance difference to the first luminance value is in a range of 9:10 to 1:1.

In some embodiments, the first adjusted luminance value is 0.

In some embodiments, the first subpixel is a subpixel of a first color, the second subpixel is a subpixel of a second color, the first color being different from the second color.

In some embodiments, the memory further stores computer-executable instructions for controlling the one or more processors to reduce a third luminance value of a third subpixel in the respective pixel to a third adjusted luminance value; reduce a fourth luminance value of a fourth subpixel in the respective pixel to a fourth adjusted luminance value; increase a second luminance value of a second subpixel in the respective pixel to a second adjusted luminance value; convert the second adjusted luminance value of the second subpixel in the respective pixel in the static image into a second adjusted subpixel value; convert the third adjusted luminance value of the third subpixel in the respective pixel in the static image into a third adjusted subpixel value; convert the fourth adjusted luminance value of the fourth subpixel in the respective pixel in the static image into a fourth adjusted subpixel value; and cause the display panel to display the static image using the first adjusted subpixel value, the second adjusted subpixel value, the third adjusted subpixel value, and the fourth adjusted subpixel value.

In some embodiments, the first luminance value of the first subpixel in the respective pixel is reduced by a first luminance difference to obtain the first adjusted luminance value; the third luminance value of the third subpixel in the respective pixel is reduced by a third luminance difference to obtain the third adjusted luminance value; the fourth luminance value of the fourth subpixel in the respective pixel is reduced by a fourth luminance difference to obtain the fourth adjusted luminance value; and the second luminance value of the second subpixel in the respective pixel is increased by a second luminance difference to obtain the second adjusted luminance value. Optionally, the second luminance difference is substantially the same as a sum of the first luminance difference, the third luminance difference, and the fourth luminance difference.

In some embodiments, a first ratio of the first luminance difference to the first luminance value is substantially the same as a second ratio of the third luminance difference to the third luminance value, and is substantially the same as a third ratio of the fourth luminance difference to the fourth luminance value.

In some embodiments, the first ratio, the second ratio, and the third ratio are in a range of 6:10 to 8:10.

In some embodiments, the first subpixel is a subpixel of a first color, the second subpixel is a subpixel of a second color, the third subpixel is a subpixel of a third color, and the fourth subpixel is a subpixel of a fourth color, and the first color, the second color, the third color, and the fourth color are four different colors.

In some embodiments, the memory further stores computer-executable instructions for controlling the one or more processors to in a first phase, reduce the first luminance value of the first subpixel in the respective pixel to the first adjusted luminance value; increase a second luminance value of a second subpixel in the respective pixel to a second adjusted luminance value; in the first phase, convert the first adjusted luminance value of the first subpixel in the respective pixel in the static image into the first adjusted subpixel value; convert the second adjusted luminance value of the second subpixel in the respective pixel in the static image into a second adjusted subpixel value; and cause the display panel to display the static image using the first adjusted subpixel value, the second adjusted subpixel value, the third subpixel value, and the fourth subpixel value; in a second phase, reduce the first luminance value of the first subpixel in the respective pixel to the first adjusted luminance value; increase a third luminance value of a third subpixel in the respective pixel to a third adjusted luminance value; reduce the second adjusted luminance value of the second subpixel to the second luminance value; in the second phase, convert the first adjusted luminance value of the first subpixel in the respective pixel in the static image into the first adjusted subpixel value; convert the third adjusted luminance value of the third subpixel in the respective pixel in the static image into a third adjusted subpixel value; and cause the display panel to display the static image using subpixel values including the first adjusted subpixel value and the second subpixel value.

In some embodiments, in the first phase, the first luminance value of the first subpixel in the respective pixel is reduced by a first luminance difference to obtain the first adjusted luminance value, and the second luminance value of the second subpixel in the respective pixel is increased by a second luminance difference to obtain the second adjusted luminance value; in the second phase, the first luminance value of the first subpixel in the respective pixel is reduced by a first luminance difference to obtain the first adjusted luminance value, and the third luminance value of the third subpixel in the respective pixel is increased by a third luminance difference to obtain the third adjusted luminance value. Optionally, in the first phase, the second luminance difference is substantially the same as the first luminance difference. Optionally, in the second phase, the third luminance difference is substantially the same as the first luminance difference.

In some embodiments, a first ratio of the first luminance difference to the first luminance value is in a range of 9:10 to 1:1.

In some embodiments, the first adjusted luminance value is 0.

In another aspect, the present disclosure provides a computer program product comprising a non-transitory tangible computer-readable medium having computer-readable instructions thereon. In some embodiments, the computer-readable instructions are executable by one or more processors to cause the one or more processors to perform detecting a region configured to display a static image; in the first region configured to display the static image, detecting a parameter of driving transistors of subpixels of a first color in first periods, and detecting a parameter of driving transistors of subpixels of a second color in second periods; determining subpixel values of subpixels in a respective pixel in the static image in a respective frame of image comprising the static image; converting the subpixel values of subpixels in the respective pixel in the static image into luminance values of subpixels in the respective pixel in the static image; reducing a first luminance value of a first subpixel in the respective pixel to a first adjusted luminance value; and converting the first adjusted luminance value of the first subpixel in the respective pixel in the static image into a first adjusted subpixel value. Optionally, the parameter of driving transistors of subpixels of the first color is detected with a first frequency. Optionally, the parameter of driving transistors of subpixels of the second color is detected with a second frequency. Optionally, the first frequency is higher than the second frequency.

In some embodiments, the computer-readable instructions are executable by one or more processors to cause the one or more processors to further perform causing the display panel to display the static image using subpixel values including the first adjusted subpixel value and the second subpixel value.

In some embodiments, the first luminance value of the first subpixel sp1 in the respective pixel is reduced by a first luminance difference to obtain the first adjusted luminance value. Optionally, a first ratio of the first luminance difference to the first luminance value is in a range of 1:10 to 9:10.

In some embodiments, the computer-readable instructions are executable by one or more processors to cause the one or more processors to further perform increasing at least a second luminance value of a second subpixel in the respective pixel to a second adjusted luminance value; convening adjusted luminance values of subpixels in the respective pixel in the static image into adjusted subpixel values of subpixels in the respective pixel in the static image; and causing the display panel to display the static image using the adjusted subpixel values.

In some embodiments, subsequent to reducing at least the first luminance value of the first subpixel in the respective pixel to the first adjusted luminance value, and increasing at least the second luminance value of the second subpixel in the respective pixel to the second adjusted luminance value, a total luminance value of the subpixels of the respective pixel remains substantially the same.

In some embodiments, the first luminance value of the first subpixel in the respective pixel is reduced by a first luminance difference to obtain the first adjusted luminance value; and the second luminance value of the second subpixel in the respective pixel is increased by a second luminance difference to obtain the second adjusted luminance value. Optionally, the second luminance difference is substantially the same as the first luminance difference.

In some embodiments, a first ratio of the first luminance difference to the first luminance value is in a range of 9:10 to 1:1.

In some embodiments, the first adjusted luminance value is 0.

In some embodiments, the first subpixel is a subpixel of a first color, the second subpixel is a subpixel of a second color, the first color being different from the second color.

In some embodiments, the computer-readable instructions are executable by one or more processors to cause the one or more processors to further perform reducing a third luminance value of a third subpixel in the respective pixel to a third adjusted luminance value; reducing a fourth luminance value of a fourth subpixel in the respective pixel to a fourth adjusted luminance value; increasing a second luminance value of a second subpixel in the respective pixel to a second adjusted luminance value; converting the second adjusted luminance value of the second subpixel in the respective pixel in the static image into a second adjusted subpixel value; convening the third adjusted luminance value of the third subpixel in the respective pixel in the static image into a third adjusted subpixel value; convening the fourth adjusted luminance value of the fourth subpixel in the respective pixel in the static image into a fourth adjusted subpixel value; and causing the display panel to display the static image using the first adjusted subpixel value, the second adjusted subpixel value, the third adjusted subpixel value, and the fourth adjusted subpixel value.

In some embodiments, the first luminance value of the first subpixel in the respective pixel is reduced by a first luminance difference to obtain the first adjusted luminance value; the third luminance value of the third subpixel in the respective pixel is reduced by a third luminance difference to obtain the third adjusted luminance value; the fourth luminance value of the fourth subpixel in the respective pixel is reduced by a fourth luminance difference to obtain the fourth adjusted luminance value; and the second luminance value of the second subpixel in the respective pixel is increased by a second luminance difference to obtain the second adjusted luminance value. Optionally, the second luminance difference is substantially the same as a sum of the first luminance difference, the third luminance difference, and the fourth luminance difference.

In some embodiments, a first ratio of the first luminance difference to the first luminance value is substantially the same as a second ratio of the third luminance difference to the third luminance value, and is substantially the same as a third ratio of the fourth luminance difference to the fourth luminance value.

In some embodiments, the first ratio, the second ratio, and the third ratio are in a range of 6:10 to 8:10.

In some embodiments, the first subpixel is a subpixel of a first color, the second subpixel is a subpixel of a second color, the third subpixel is a subpixel of a third color, and the fourth subpixel is a subpixel of a fourth color; and the first color, the second color, the third color, and the fourth color are four different colors.

In some embodiments, the computer-readable instructions are executable by one or more processors to cause the one or more processors to further perform in a first phase, reducing the first luminance value of the first subpixel in the respective pixel to the first adjusted luminance value; increasing a second luminance value of a second subpixel in the respective pixel to a second adjusted luminance value; in the first phase, converting the first adjusted luminance value of the first subpixel in the respective pixel in the static image into the first adjusted subpixel value; converting the second adjusted luminance value of the second subpixel in the respective pixel in the static image into a second adjusted subpixel value; and causing the display panel to display the static image using the first adjusted subpixel value, the second adjusted subpixel value, the third subpixel value, and the fourth subpixel value; in a second phase, reducing the first luminance value of the first subpixel in the respective pixel to the first adjusted luminance value; increasing a third luminance value of a third subpixel in the respective pixel to a third adjusted luminance value; reducing the second adjusted luminance value of the second subpixel to the second luminance value; and in the second phase, converting the first adjusted luminance value of the first subpixel in the respective pixel in the static image into the first adjusted subpixel value; converting the third adjusted luminance value of the third subpixel in the respective pixel in the static image into a third adjusted subpixel value; and causing the display panel to display the static image using subpixel values including the first adjusted subpixel value and the second subpixel value.

In some embodiments, in the first phase, the first luminance value of the first subpixel in the respective pixel is reduced by a first luminance difference to obtain the first adjusted luminance value, and the second luminance value of the second subpixel in the respective pixel is increased by a second luminance difference to obtain the second adjusted luminance value; and in the second phase, the first luminance value of the first subpixel in the respective pixel is reduced by a first luminance difference to obtain the first adjusted luminance value, and the third luminance value of the third subpixel in the respective pixel is increased by a third luminance difference to obtain the third adjusted luminance value. Optionally, in the first phase, the second luminance difference is substantially the same as the first luminance difference. Optionally, in the second phase, the third luminance difference is substantially the same as the first luminance difference.

In some embodiments, a first ratio of the first luminance difference to the first luminance value is in a range of 9:10 to 1:1.

In some embodiments, the first adjusted luminance value is 0.

All or some of steps of the method, functional modules/units in the system and the device disclosed above may be implemented as software, firmware, hardware, or suitable combinations thereof. In a hardware implementation, a division among functional modules/units mentioned in the above description does not necessarily correspond to the division among physical components. For example, one physical component may have a plurality of functions, or one function or step may be performed by several physical components in cooperation. Some or all of the physical components may be implemented as software executed by a processor, such as a central processing unit, a digital signal processor, or a microprocessor, or as hardware, or as an integrated circuit, such as an application specific integrated circuit. Such software may be distributed on a computer-readable storage medium, which may include a computer storage medium (or a non-transitory medium) and a communication medium (or a transitory medium). The term computer storage medium includes volatile and nonvolatile, removable and non-removable media implemented in any method or technology for storage of information, such as computer readable instructions, data structures, program modules or other data, as is well known to one of ordinary skill in the art. A computer storage medium includes, but is not limited to, RAM, ROM, EEPROM, flash memory or other memory technology, CD-ROM, Digital Versatile Disk (DVD) or other optical disk storage, magnetic cassette, magnetic tape, magnetic disk storage or other magnetic storage device, or any other medium which may be used to store desired information, and which may be accessed by a computer. In addition, a communication medium typically embodies computer readable instructions, data structures, program modules or other data in a modulated data signal such as a carrier wave or other transport mechanism, and includes any information delivery medium, as is well known to one of ordinary skill in the art.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display apparatus, comprising:
a display panel;
a memory; and
one or more processors;
wherein the memory and the one or more processors are connected with each other; and
the memory stores computer-executable instructions for controlling the one or more processors to:
detect a region configured to display a static image;
in the region configured to display the static image, detect a parameter of driving transistors of subpixels of a first color in first periods, and detect a parameter of driving transistors of subpixels of a second color in second periods;
determine subpixel values of subpixels in a respective pixel in the static image in a respective frame of image comprising the static image;
convert the subpixel values of subpixels in the respective pixel in the static image into luminance values of subpixels in the respective pixel in the static image;
reduce a first luminance value of a first subpixel in the respective pixel to a first adjusted luminance value; and
convert the first adjusted luminance value of the first subpixel in the respective pixel in the static image into a first adjusted subpixel value;
wherein the parameter of driving transistors of subpixels of the first color is detected with a first frequency;
the parameter of driving transistors of subpixels of the second color is detected with a second frequency; and
the first frequency is higher than the second frequency.

2. The display apparatus of claim 1, wherein the memory further stores computer-executable instructions for controlling the one or more processors to cause the display panel to display the static image using subpixel values including the first adjusted subpixel value and the second subpixel value.

3. The display apparatus of claim 2, wherein the first luminance value of the first subpixel in the respective pixel is reduced by a first luminance difference to obtain the first adjusted luminance value; and
a first ratio of the first luminance difference to the first luminance value is in a range of 1:10 to 9:10.

4. The display apparatus of claim 1, wherein the memory further stores computer-executable instructions for controlling the one or more processors to:
increase at least a second luminance value of a second subpixel in the respective pixel to a second adjusted luminance value;
convert adjusted luminance values of subpixels in the respective pixel in the static image into adjusted subpixel values of subpixels in the respective pixel in the static image; and
cause the display panel to display the static image using the adjusted subpixel values.

5. The display apparatus of claim 4, wherein, subsequent to reducing at least the first luminance value of the first subpixel in the respective pixel to the first adjusted luminance value, and increasing at least the second luminance value of the second subpixel in the respective pixel to the second adjusted luminance value, a total luminance value of the subpixels of the respective pixel remains substantially the same.

6. The display apparatus of claim 4, wherein the first luminance value of the first subpixel in the respective pixel is reduced by a first luminance difference to obtain the first adjusted luminance value;
the second luminance value of the second subpixel in the respective pixel is increased by a second luminance difference to obtain the second adjusted luminance value; and
the second luminance difference is substantially the same as the first luminance difference.

7. The display apparatus of claim 6, wherein a first ratio of the first luminance difference to the first luminance value is in a range of 9:10 to 1:1.

8. The display apparatus of claim 4, wherein the first adjusted luminance value is 0.

9. The display apparatus of claim 4, wherein the first subpixel is a subpixel of a first color, the second subpixel is a subpixel of a second color, the first color being different from the second color.

10. The display apparatus of claim 1, wherein the memory further stores computer-executable instructions for controlling the one or more processors to:
reduce a third luminance value of a third subpixel in the respective pixel to a third adjusted luminance value;
reduce a fourth luminance value of a fourth subpixel in the respective pixel to a fourth adjusted luminance value;
increase a second luminance value of a second subpixel in the respective pixel to a second adjusted luminance value;
convert the second adjusted luminance value of the second subpixel in the respective pixel in the static image into a second adjusted subpixel value;
convert the third adjusted luminance value of the third subpixel in the respective pixel in the static image into a third adjusted subpixel value;
convert the fourth adjusted luminance value of the fourth subpixel in the respective pixel in the static image into a fourth adjusted subpixel value; and
cause the display panel to display the static image using the first adjusted subpixel value, the second adjusted subpixel value, the third adjusted subpixel value, and the fourth adjusted subpixel value.

11. The display apparatus of claim 10, wherein the first luminance value of the first subpixel in the respective pixel is reduced by a first luminance difference to obtain the first adjusted luminance value;
the third luminance value of the third subpixel in the respective pixel is reduced by a third luminance difference to obtain the third adjusted luminance value;
the fourth luminance value of the fourth subpixel in the respective pixel is reduced by a fourth luminance difference to obtain the fourth adjusted luminance value;
the second luminance value of the second subpixel in the respective pixel is increased by a second luminance difference to obtain the second adjusted luminance value; and
the second luminance difference is substantially the same as a sum of the first luminance difference, the third luminance difference, and the fourth luminance difference.

12. The display apparatus of claim 11, wherein a first ratio of the first luminance difference to the first luminance value is substantially the same as a second ratio of the third luminance difference to the third luminance value, and is substantially the same as a third ratio of the fourth luminance difference to the fourth luminance value.

13. The display apparatus of claim 12, wherein the first ratio, the second ratio, and the third ratio are in a range of 6:10 to 8:10.

14. The display apparatus of claim 10, wherein the first subpixel is a subpixel of a first color, the second subpixel is a subpixel of a second color, the third subpixel is a subpixel of a third color, and the fourth subpixel is a subpixel of a fourth color; and the first color, the second color, the third color, and the fourth color are four different colors.

15. The display apparatus of claim 1, wherein the memory further stores computer-executable instructions for controlling the one or more processors to:

in a first phase, reduce the first luminance value of the first subpixel in the respective pixel to the first adjusted luminance value; increase a second luminance value of a second subpixel in the respective pixel to a second adjusted luminance value;

in the first phase, convert the first adjusted luminance value of the first subpixel in the respective pixel in the static image into the first adjusted subpixel value; convert the second adjusted luminance value of the second subpixel in the respective pixel in the static image into a second adjusted subpixel value; and cause the display panel to display the static image using subpixel values including the first adjusted subpixel value and a second subpixel value of a second subpixel in the respective pixel;

in a second phase, reduce the first luminance value of the first subpixel in the respective pixel to the first adjusted luminance value; increase a third luminance value of a third subpixel in the respective pixel to a third adjusted luminance value; reduce the second adjusted luminance value of the second subpixel to the second luminance value; and in the second phase, convert the first adjusted luminance value of the first subpixel in the respective pixel in the static image into the first adjusted subpixel value; convert the third adjusted luminance value of the third subpixel in the respective pixel in the static image into a third adjusted subpixel value; and cause the display panel to display the static image using subpixel values including the first adjusted subpixel value and the second subpixel value.

16. The display apparatus of claim 15, wherein, in the first phase, the first luminance value of the first subpixel in the respective pixel is reduced by a first luminance difference to obtain the first adjusted luminance value, and the second luminance value of the second subpixel in the respective pixel is increased by a second luminance difference to obtain the second adjusted luminance value;

in the first phase, the second luminance difference is substantially the same as the first luminance difference;

in the second phase, the first luminance value of the first subpixel in the respective pixel is reduced by a first luminance difference to obtain the first adjusted luminance value, and the third luminance value of the third subpixel in the respective pixel is increased by a third luminance difference to obtain the third adjusted luminance value; and in the second phase, the third luminance difference is substantially the same as the first luminance difference.

17. The display apparatus of claim 16, wherein a first ratio of the first luminance difference to the first luminance value is in a range of 9:10 to 1:1.

18. The display apparatus of claim 15, wherein the first adjusted luminance value is 0.

19. A method of displaying an image, comprising:

detecting a region configured to display a static image in a display panel;

in the region configured to display the static image, detecting a parameter of driving transistors of subpixels of a first color in first periods, and detecting a parameter of driving transistors of subpixels of a second color in second periods;

determining subpixel values of subpixels in a respective pixel in the static image in a respective frame of image comprising the static image;

converting the subpixel values of subpixels in the respective pixel in the static image into luminance values of subpixels in the respective pixel in the static image;

reducing a first luminance value of a first subpixel in the respective pixel to a first adjusted luminance value; and converting the first adjusted luminance value of the first subpixel in the respective pixel in the static image into a first adjusted subpixel value;

wherein the parameter of driving transistors of subpixels of the first color is detected with a first frequency;

the parameter of driving transistors of subpixels of the second color is detected with a second frequency; and the first frequency is higher than the second frequency.

20. A computer-program product, comprising a non-transitory tangible computer-readable medium having computer-readable instructions thereon, the computer-readable instructions being executable by a processor to cause the processor to perform:

detecting a region configured to display a static image;

in the region configured to display the static image, detecting a parameter of driving transistors of subpixels of a first color in first periods, and detecting a parameter of driving transistors of subpixels of a second color in second periods;

determining subpixel values of subpixels in a respective pixel in the static image in a respective frame of image comprising the static image;

converting the subpixel values of subpixels in the respective pixel in the static image into luminance values of subpixels in the respective pixel in the static image;

reducing a first luminance value of a first subpixel in the respective pixel to a first adjusted luminance value; and converting the first adjusted luminance value of the first subpixel in the respective pixel in the static image into a first adjusted subpixel value;

wherein the parameter of driving transistors of subpixels of the first color is detected with a first frequency;

the parameter of driving transistors of subpixels of the second color is detected with a second frequency; and the first frequency is higher than the second frequency.

* * * * *